(12) United States Patent
Syouge et al.

(10) Patent No.: US 11,535,334 B2
(45) Date of Patent: Dec. 27, 2022

(54) OPERATING SYSTEM AND ELECTRICAL SWITCH DEVICE FOR HUMAN-POWERED VEHICLE

(71) Applicant: SHIMANO INC., Sakai (JP)

(72) Inventors: Akihiko Syouge, Sakai (JP); Takuma Sakai, Sakai (JP); Kazuma Mori, Sakai (JP); Yasuyuki Komada, Sakai (JP); Takehiko Nakajima, Sakai (JP); Noor Ashyikkin Binti Mohd Noor, Sakai (JP)

(73) Assignee: SHIMANO INC., Sakai (JP)

( * ) Notice: Subject to any disclaimer, the term of this patent is extended or adjusted under 35 U.S.C. 154(b) by 918 days.

(21) Appl. No.: 16/368,786

(22) Filed: Mar. 28, 2019

(65) Prior Publication Data

US 2019/0351965 A1 Nov. 21, 2019

Related U.S. Application Data

(63) Continuation-in-part of application No. 15/983,099, filed on May 18, 2018, now abandoned.

(51) Int. Cl.
*B62K 23/02* (2006.01)
*B62M 6/45* (2010.01)
(Continued)

(52) U.S. Cl.
CPC ............... *B62K 23/02* (2013.01); *B62M 6/45* (2013.01); *B62M 25/08* (2013.01); *H01R 9/11* (2013.01); *H01R 11/11* (2013.01); *H02G 3/02* (2013.01); *B62J 45/20* (2020.02); *B62J 45/422* (2020.02); *B62L 3/00* (2013.01); *B62M 9/122* (2013.01); *B62M 9/132* (2013.01); *H01B 7/009* (2013.01)

(58) Field of Classification Search
CPC .. G05G 1/00; G05G 1/02; G05G 1/04; G05G 1/06; H01B 7/009; B62L 3/00; B62L 3/02; B62J 45/00; B62J 45/20; B62J 45/40; B62J 45/422; H02G 3/00; H02G 3/02; H01R 9/00; H01R 9/11; H01R 11/00; H01R 11/11; B62M 9/122; B62M 9/132; B62M 6/45; B62M 25/08; B62K 23/02
USPC ........................................................ 200/5 R
See application file for complete search history.

(56) References Cited

U.S. PATENT DOCUMENTS 8,655,548 B2* 2/2014 Ichida ................... B62M 25/08
439/127
10,065,706 B2 9/2018 Iino et al.
(Continued)

FOREIGN PATENT DOCUMENTS

| CN | 106184566 | 12/2016 |
| CN | 107434003 | 12/2017 |
| JP | 2017-95036 | 6/2017 |

*Primary Examiner* — Anthony R Jimenez
(74) *Attorney, Agent, or Firm* — Mori & Ward, LLP

(57) ABSTRACT

An electrical switch device for a human-powered vehicle comprises an electrical switch unit and a connecting part. The electrical switch unit is configured to generate a signal in response to a user input. The connecting part is provided on the electrical switch unit so as to electrically connect an additional electrical switch device to the electrical switch device. The electrical switch device is configured to selectively transmit the signal from the electrical switch unit and an additional signal from the additional electrical switch device to an operating device configured to operate the electric component.

20 Claims, 31 Drawing Sheets

(51) Int. Cl.
*H01R 9/11* (2006.01)
*H01R 11/11* (2006.01)
*H02G 3/02* (2006.01)
*B62M 25/08* (2006.01)
*H01B 7/00* (2006.01)
*B62M 9/132* (2010.01)
*B62J 45/422* (2020.01)
*B62M 9/122* (2010.01)
*B62J 45/20* (2020.01)
*B62L 3/00* (2006.01)

(56) References Cited

U.S. PATENT DOCUMENTS

2008/0168856 A1 7/2008 Tetsuka
2014/0214285 A1* 7/2014 Wesling .................. F16H 59/02
　　　　　　　　　　　　　　　　　　　　　　701/51
2016/0347416 A1 12/2016 Katsura et al.
2017/0050701 A1 2/2017 Feuerstein et al.
2017/0369125 A1 12/2017 Katsura

* cited by examiner

OPERATING SYSTEM AND ELECTRICAL SWITCH DEVICE FOR HUMAN-POWERED VEHICLE

CROSS-REFERENCE TO RELATED APPLICATIONS

The present application is a continuation-in-part application of the U.S. patent application Ser. No. 15/983,099 filed May 18, 2018. The contents of this application are incorporated herein by reference in their entirety.

BACKGROUND OF THE INVENTION

Field of the Invention

The present invention relates to an operating system and an electrical switch device for a human-powered vehicle.

Discussion of the Background

U.S. Patent Application Publication No. 2017/0050701 discloses a bicycle control system. The bicycle control system includes a control mechanism for generating a control signal to control a bicycle component.

SUMMARY OF THE INVENTION

In accordance with a first aspect of the present invention, an electrical switch device for a human-powered vehicle comprises an electrical switch unit and a connecting part. The electrical switch unit is configured to generate a signal in response to a user input. The connecting part is provided on the electrical switch unit so as to electrically connect an additional electrical switch device to the electrical switch device. The electrical switch device is configured to selectively transmit the signal from the electrical switch unit and an additional signal from the additional electrical switch device to an operating device configured to operate an electric component.

With the electrical switch device according to the first aspect, it is possible to transmit the signal and the additional signal to the operating device with the electrical switch device. This improves the operability to operate the electric component with a simple structure.

In accordance with a second aspect of the present invention, an electrical switch device for a human-powered vehicle comprises an electrical switch unit and a connecting part. The electrical switch unit is configured to generate a signal in response to a user input. The connecting part is configured to electrically and detachably connect an additional electrical switch device to the electrical switch device. The electrical switch device is configured to selectively transmit the signal from the electrical switch unit and an additional signal from the additional electrical switch device to an operating device configured to operate an electric component.

With the electrical switch device according to the second aspect, it is possible to transmit the signal and the additional signal to the operating device with the electrical switch device. This improves the operability to operate the electric component with a simple structure.

In accordance with a third aspect of the present invention, the electrical switch device according to the second aspect further comprises an electrical cable configured to electrically connect the electrical switch unit to the operating device.

With the electrical switch device according to the third aspect, it is possible to transmit the signal and the additional signal to the operating device with the electrical cable. This further improves the operability to operate the electric component with a simple structure.

In accordance with a fourth aspect of the present invention, the electrical switch device according to the third aspect further comprises a connector provided at an end of the electrical cable to be detachably coupled to the operating device.

With the electrical switch device according to the fourth aspect, the connector allows the electrical switch device to be coupled to the operating device and a device other than the operating device. This improves convenience of the electrical switch device.

In accordance with a fifth aspect of the present invention, the electrical switch device according to the fourth aspect is configured so that the connecting part is provided on at least one of the electrical switch unit, the electrical cable and the connector.

With the electrical switch device according to the fifth aspect, it is possible to further improve convenience of the electrical switch device.

In accordance with a sixth aspect of the present invention, the electrical switch device according to the first aspect further comprises an electrical cable configured to electrically connect the electrical switch unit to the operating device.

With the electrical switch device according to the sixth aspect, it is possible to transmit the signal and the additional signal to the operating device with the electrical cable. This further improves the operability to operate the electric component with a simple structure.

In accordance with a seventh aspect of the present invention, the electrical switch device according to the sixth aspect further comprises a connector provided at an end of the electrical cable to be detachably coupled to the operating device.

With the electrical switch device according to the seventh aspect, the connector allows the electrical switch device to be coupled to the operating device and a device other than the operating device. This improves convenience of the electrical switch device.

In accordance with an eighth aspect of the present invention, the electrical switch device according to any one of the third to seventh aspects is configured so that the connecting part is configured to be electrically connected to the electrical cable.

With the electrical switch device according to the eighth aspect, it is possible to transmit the additional signal from the connecting part to the electrical cable in a state where the additional electrical switch device is electrically connected to the connecting part.

In accordance with a ninth aspect of the present invention, the electrical switch device according to the eighth aspect is configured so that the electrical cable is electrically connected to the additional electrical switch device to transmit the additional signal to the operating device.

With the electrical switch device according to the ninth aspect, it is possible to transmit the additional signal to the operating device through the electrical cable.

In accordance with a tenth aspect of the present invention, the electrical switch device according to the first or second aspect further comprises a wireless communicator configured to wirelessly and selectively transmit the signal and the additional signal to operate the electric component.

With the electrical switch device according to the tenth aspect, it is possible to omit an electrical cable from the electrical switch device. This simplifies the structure of the electrical switch device.

In accordance with an eleventh aspect of the present invention, the electrical switch device according to the tenth aspect is configured so that the wireless communicator is configured to be attached to a bar end of a handlebar.

With the electrical switch device according to the eleventh aspect, it is possible to improve wireless communication of the wireless communicator.

In accordance with a twelfth aspect of the present invention, the electrical switch device according to the eleventh aspect is configured so that the wireless communicator is configured to be inserted to an internal space of the handlebar.

With the electrical switch device according to the twelfth aspect, it is possible to utilize the internal space of the handlebar.

In accordance with a thirteenth aspect of the present invention, the electrical switch device according to the eleventh aspect is configured so that the wireless communicator is configured to be attached to an outer surface of the handlebar.

With the electrical switch device according to the thirteenth aspect, it is possible to reliably improve the wireless communication of the wireless communicator.

In accordance with a fourteenth aspect of the present invention, the electrical switch device according to any one of the first to thirteenth aspects is configured so that the connecting part is configured to be coupled to an additional electrical cable of the additional electrical switch device.

With the electrical switch device according to the fourteenth aspect, it is possible to transmit the additional signal to the operating device through the connecting part in a state where the additional electrical cable is coupled to the connecting part.

In accordance with a fifteenth aspect of the present invention, the electrical switch device according to the fourteenth aspect is configured so that the connecting part includes a cable connection port to which the additional electrical cable is detachably coupled.

With the electrical switch device according to the fifteenth aspect, the cable connection port allows the additional electrical switch device and a device other than the additional electrical switch device to be coupled to the electrical switch device. This improves convenience of the electrical switch device.

In accordance with a sixteenth aspect of the present invention, the electrical switch device according to any one of the first and tenth to fifteenth aspects is configured so that the connecting part includes an additional wireless communicator configured to wirelessly receive the additional signal.

With the electrical switch device according to the sixteenth aspect, it is possible to omit an electrical cable from the additional electrical switch device. This simplifies the structure of the additional electrical switch device.

In accordance with a seventeenth aspect of the present invention, the electrical switch device according to any one of the first to sixteenth aspects further comprises a mounting structure configured to be mounted to a bicycle body.

With the electrical switch device according to the seventeenth aspect, it is possible to mount the electrical switch device to the bicycle body. This improves convenience of the electrical switch device.

In accordance with an eighteenth aspect of the present invention, the electrical switch device according to any one of the first to seventeenth aspects is configured so that the operating device comprises a base member and an operating member pivotally coupled to the base member.

With the electrical switch device according to the eighteenth aspect, it is possible to operate another component using the operating member.

In accordance with a nineteenth aspect of the present invention, an electrical switch device for a human-powered vehicle comprises an electrical switch unit and a wireless communicator. The electrical switch unit is configured to generate a signal in response to a user input. The wireless communicator is configured to wirelessly transmit the signal to an operating device configured to operate an electric component. The signal is configured to operate the electric component.

With the electrical switch device according to the nineteenth aspect, it is possible to omit an electrical cable from the electrical switch device. This simplifies the structure of the electrical switch device.

In accordance with a twentieth aspect of the present invention, an operating system for a human-powered vehicle comprises the electrical switch device according to any one of the first to nineteenth aspects and the operating device configured to operate the electric component in response to each of the signal and the additional signal.

With the operating system according to the twentieth aspect, it is possible to operate the electric component using the signal and the additional signal which are input from the electrical switch device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
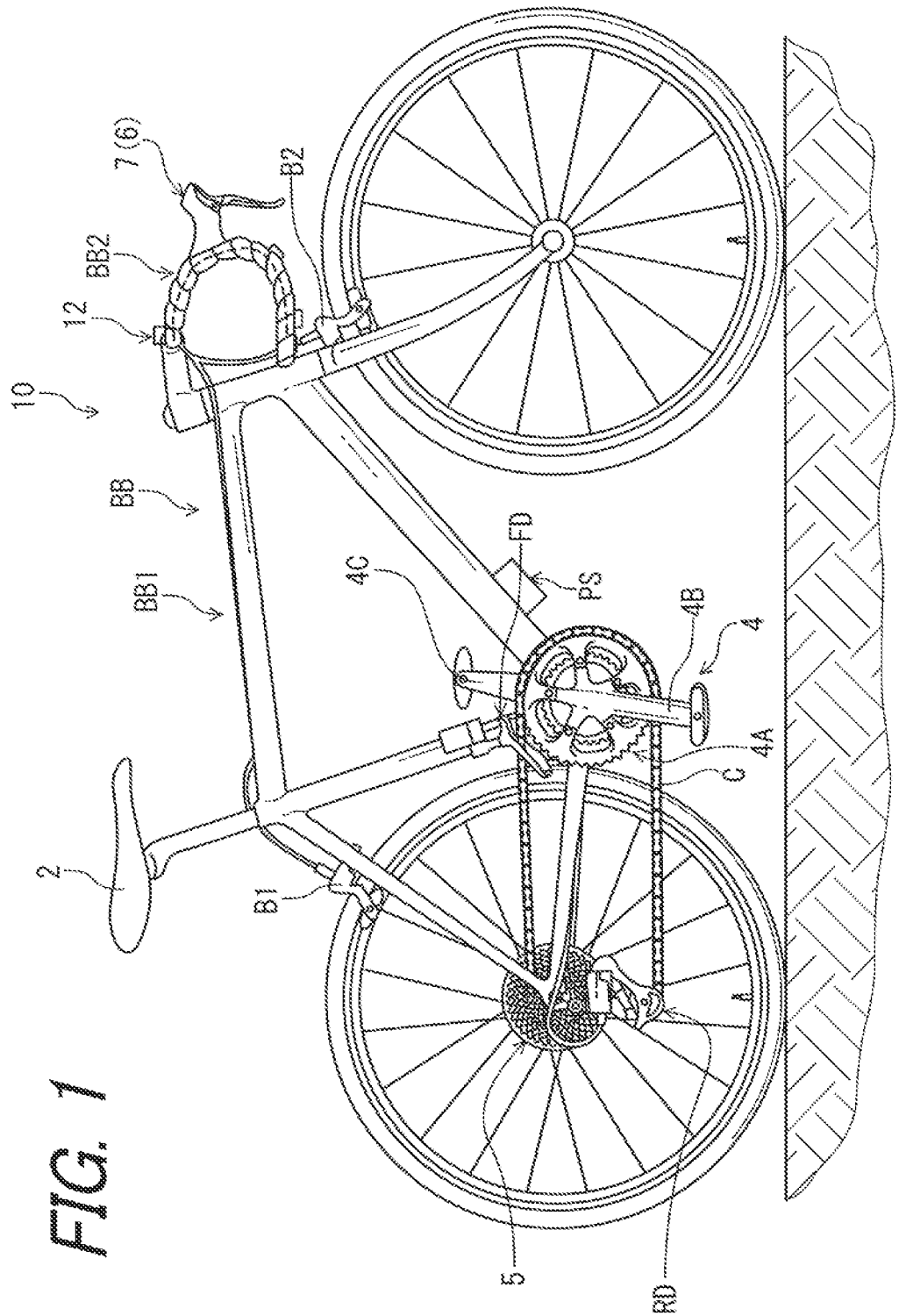
FIG. 1 is a side elevational view of a human-powered vehicle provided with an operating system in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle 10 includes an operating system 12 in accordance with a first embodiment. The human-powered vehicle 10 is a vehicle to travel with a motive power including at least a human power of a rider who rides the human-powered vehicle 10. The human-powered vehicle 10 has an arbitrary number of wheels. For example, the human-powered vehicle 10 has either one, two, three, four, five or more wheels. In this embodiment, the human-powered vehicle 10 has a smaller size than that of a four-wheeled automobile, but the human-powered vehicle 10 can have an arbitrary size. For example, the human-powered vehicle 10 can be larger than the four-wheeled automobile.

In this embodiment, the human-powered vehicle 10 includes a bicycle. However, the human-powered vehicle 10 can include other vehicles such as a tricycle, and a kick scooter. While the human-powered vehicle 10 is illustrated as a road bike, the operating system 12 can apply to mountain bikes or any type of bicycle in a case where the operating system 12 applies to a bicycle.

As seen in FIG. 1, the human-powered vehicle 10 includes a bicycle body BB, a saddle 2, a crank assembly 4, a rear multiple sprocket 5, an operating device 6, an operating device 7, an electric component FD, and an electric component RD. The bicycle body BB includes a bicycle frame BB1, and a handlebar BB2. The crank assembly 4 includes a front multiple sprocket 4A, a right crank arm 4B, and a left crank arm 4C. A chain C is engaged with the front multiple sprocket 4A and the rear multiple sprocket 5.

The operating device 6 is connected to a rear brake device B1 with an operation transmitting element such as a mechanical cable or a hydraulic hose to operate the rear brake device B1. The operating device 7 is connected to a front brake device B2 with an operation transmitting element such as a mechanical cable or a hydraulic hose to operate the front brake device B2.

The operating device 6 is configured to operate the electric component FD. The operating device 7 is configured to operate the electric component RD. The electric component FD is configured to shift the chain C between a plurality of front gear positions of the front multiple sprocket 4A in response to operation of the operating device 6. The electric component RD is configured to shift the chain C between a plurality of rear gear positions of the rear multiple sprocket 5 in response to operation of the operating device 7.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle 2 of the human-powered vehicle 10 with facing the handlebar BB2. Accordingly, these terms, as utilized to describe components of the human-powered vehicle 10, should be interpreted relative to the human-powered vehicle 10 equipped with the components as used in an upright riding position on a horizontal surface.

Figure 2:
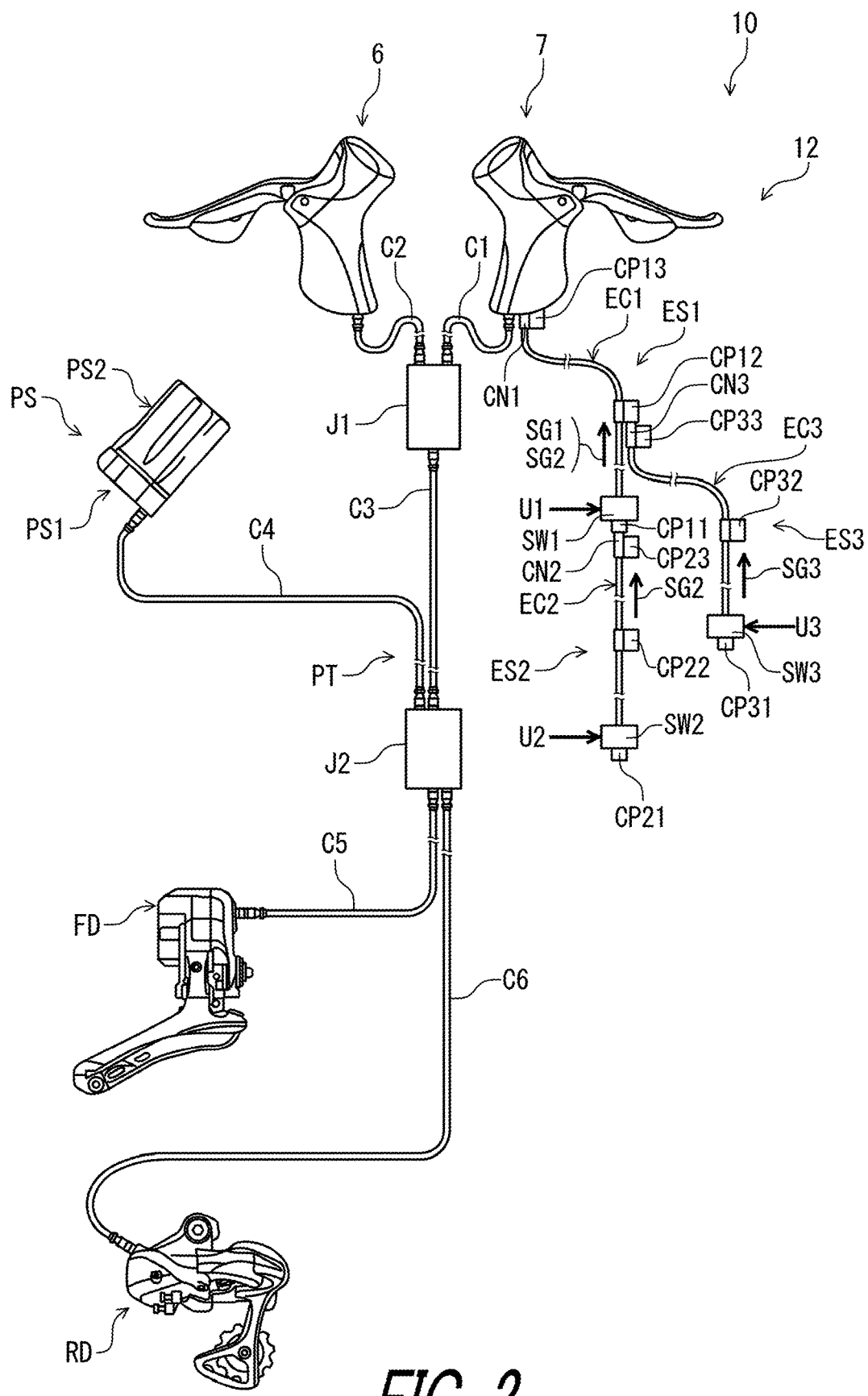
FIG. 2 is a schematic diagram of the human-powered vehicle illustrated in FIG. 1.

As seen in FIG. 2, the human-powered vehicle 10 includes a power source PS and an electrical communication path PT. The power source PS is electrically connected to the operating device 6, the operating device 7, the electric component FD, and the electric component RD with the electrical communication path PT to supply electric power to the operating device 6, the operating device 7, the electric component FD, and the electric component RD through the electrical communication path PT.

The power source PS includes a battery holder PS1 and a battery PS2. The battery holder PS1 is mounted to the bicycle frame BB1 (FIG. 1) and is configured to detachably receive the battery PS2. The battery PS2 is electrically connected to the battery holder PS1 in a state where the battery PS2 is mounted to the battery holder PS1. Examples of the battery PS2 include a primary battery (e.g., a dry-cell battery) and a secondary battery (e.g., a rechargeable battery such as a rechargeable lithium-ion battery).

The electrical communication path PT includes junctions J1 and J2 and first to sixth cables C1 to C6. The operating devices 6 and 7 are electrically connected to the battery holder PS1 and the electric components FD and RD with the electrical communication path PT. The electrical communication path PT includes a ground line and a voltage line. Electric power is supplied from the battery PS2 to the operating devices 6 and 7 and the electric components FD and RD via the voltage line.

As seen in FIG. 2, the operating system 12 for the human-powered vehicle 10 comprises an electrical switch device ES1 and the operating device 7. In this embodiment, the operating system 12 further comprises an additional electrical switch device ES2 and an additional electrical switch device ES3. Each of the additional electrical switch devices ES2 and ES3 has substantially the same structure as that of the electrical switch device ES1. However, at least one of the additional electrical switch devices ES2 and ES3 can have a different structure from that of the electrical switch device ES1. At least one of the additional electrical switch devices ES2 and ES3 can be omitted from the operating system 12.

Figure 3:
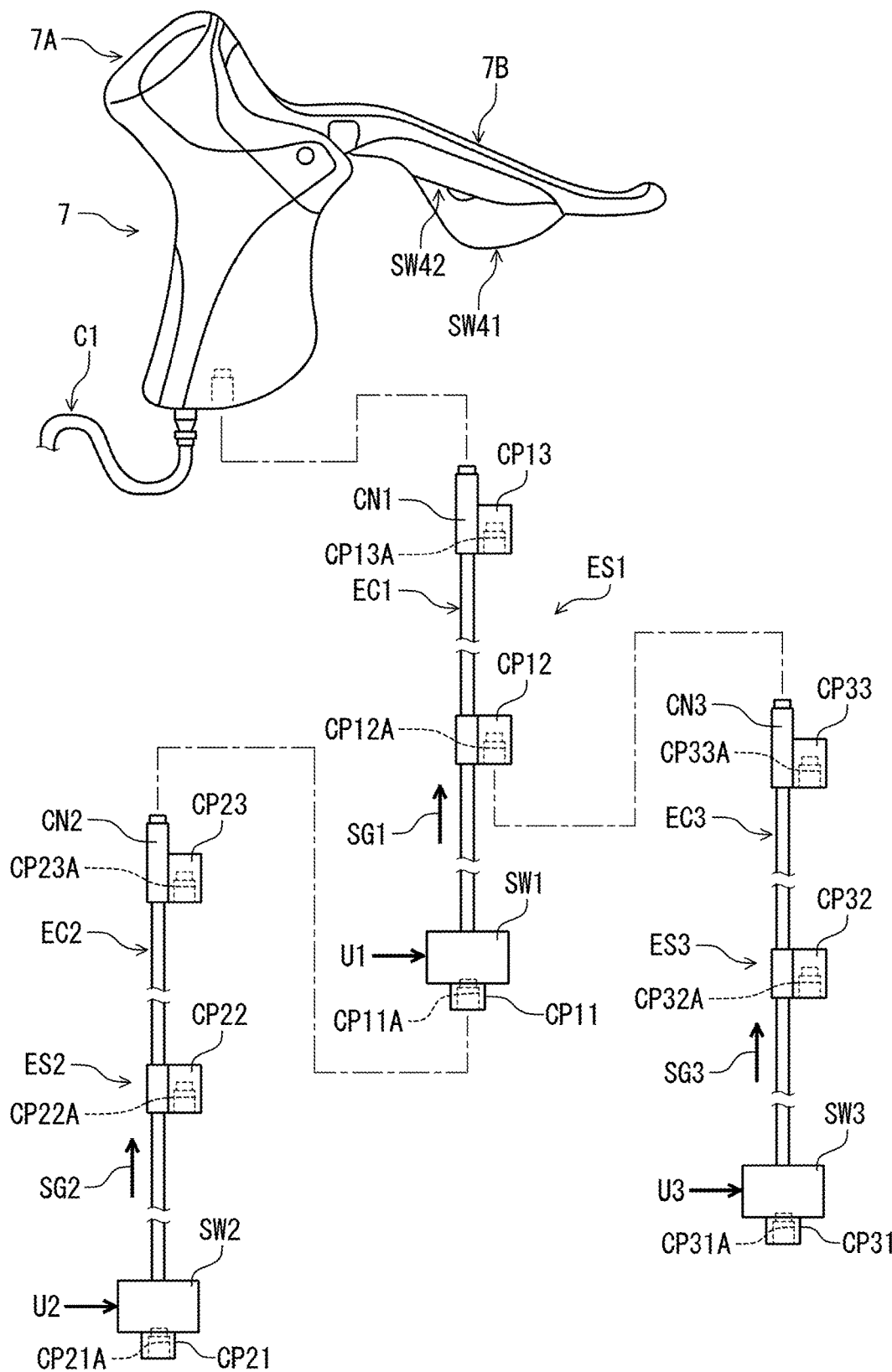
FIG. 3 is a schematic diagram of the operating system including an electrical switch device in accordance with the first embodiment.

As seen in FIG. 3, the electrical switch device ES1 for the human-powered vehicle 10 comprises an electrical switch unit SW1. The electrical switch unit SW1 is configured to generate a signal SG1 in response to a user input U1. In this embodiment, the electrical switch unit SW1 includes a normally-open switch. However, the electrical switch unit SW1 is not limited to this embodiment.

The electrical switch device ES1 for the human-powered vehicle 10 comprises a connecting part CP11. The electrical switch device ES1 further comprises an electrical cable EC1 configured to electrically connect the electrical switch unit SW1 to the operating device 7. The electrical cable EC1 extends from the electrical switch unit SW1. The electrical switch device ES1 further comprises a connector CN1 provided at an end of the electrical cable EC1 to be detachably coupled to the operating device 7.

The connecting part CP11 is provided on at least one of the electrical switch unit SW1, the electrical cable EC1 and the connector CN1. In this embodiment, the connecting part CP11 is provided on the electrical switch unit SW1 so as to electrically connect the additional electrical switch device ES2 to the electrical switch device ES1. However, the connecting part CP11 can be provided on another member such as the electrical cable EC1 and the connector CN1. The connecting part CP11 can also be referred to as a first connecting part CP11.

The electrical switch device ES1 further comprises a second connecting part CP12 and a third connecting part CP13. The second connecting part CP12 is provided on the electrical cable EC1 so as to electrically connect another electrical device to the electrical switch device ES1. The third connecting part CP13 is provided on the connector CN1 so as to electrically connect another electrical device to the electrical switch device ES1. Each of the second connecting part CP12 and the third connecting part CP13 has substantially the same structure as that of the first connecting part CP11. Thus, they will not be described in detail here for the sake of brevity.

As seen in FIG. 3, the additional electrical switch device ES2 includes an additional electrical switch unit SW2, an additional connecting part CP21, an additional electrical cable EC2, and an additional connector CN2. The additional electrical switch unit SW2 is configured to generate an additional signal SG2 in response to an additional user input U2. In this embodiment, the additional electrical switch unit SW2 includes a normally-open switch. However, the additional electrical switch unit SW2 is not limited to this embodiment.

The additional electrical cable EC2 is configured to electrically connect the additional electrical switch unit SW2 to another electrical device such as the electrical switch device ES1 or the operating device 7. The additional electrical cable EC2 extends from the additional electrical switch unit SW2. The additional connector CN2 is provided at an end of the additional electrical cable EC2 to be detachably coupled to another electrical device such as the electrical switch device ES1 or the operating device 7.

The additional connecting part CP21 is provided on at least one of the additional electrical switch unit SW2, the additional electrical cable EC2 and the additional connector CN2. In this embodiment, the additional connecting part CP21 is provided on the additional electrical switch unit SW2 so as to electrically connect another electrical device to the additional electrical switch device ES2. However, the additional connecting part CP21 can be provided on another member such as the additional electrical cable EC2 and the additional connector CN2. The additional connecting part CP21 can also be referred to as a first additional connecting part CP21.

The additional electrical switch device ES2 further comprises a second additional connecting part CP22 and a third additional connecting part CP23. The second additional connecting part CP22 is provided on the additional electrical cable EC2 so as to electrically connect another electrical device to the additional electrical switch device ES2. The third additional connecting part CP23 is provided on the additional connector CN2 so as to electrically connect another electrical device to the additional electrical switch device ES2. The second additional connecting part CP22 is electrically connected to the additional electrical cable EC2. The third additional connecting part CP23 is electrically connected to the additional connector CN2. Each of the second additional connecting part CP22 and the third additional connecting part CP23 has substantially the same structure as that of the first additional connecting part CP21. Thus, they will not be described in detail here for the sake of brevity.

As seen in FIG. 3, the additional electrical switch device ES3 includes an additional electrical switch unit SW3, an additional connecting part CP31, an additional electrical cable EC3, and an additional connector CN3. The additional electrical switch unit SW3 is configured to generate an additional signal SG3 in response to an additional user input U3. In this embodiment, the additional electrical switch unit SW3 includes a normally-open switch. However, the additional electrical switch unit SW3 is not limited to this embodiment.

The additional electrical cable EC3 is configured to electrically connect the additional electrical switch unit SW3 to another electrical device such as the electrical switch device ES1 and the operating device 7. The additional electrical cable EC3 extends from the additional electrical switch unit SW3. The additional connector CN3 provided at an end of the additional electrical cable EC3 to be detachably coupled to the other electrical device such as the electrical switch device ES1 and the operating device 7.

The additional connecting part CP31 is provided on at least one of the additional electrical switch unit SW3, the additional electrical cable EC3 and the additional connector CN3. In this embodiment, the additional connecting part CP31 is provided on the additional electrical switch unit SW3 so as to electrically connect another electrical device to the additional electrical switch device ES3. However, the additional connecting part CP31 can be provided on another member such as the additional electrical cable EC3 and the additional connector CN3. The additional connecting part CP31 can also be referred to as a first additional connecting part CP31.

The additional electrical switch device ES3 further comprises a second additional connecting part CP32 and a third additional connecting part CP33. The second additional connecting part CP32 is provided on the additional electrical cable EC3 so as to electrically connect another electrical device to the additional electrical switch device ES3. The third additional connecting part CP33 is provided on the additional connector CN3 so as to electrically connect another electrical device to the additional electrical switch device ES3. The second additional connecting part CP32 is electrically connected to the additional electrical cable EC3. The third additional connecting part CP33 is electrically connected to the additional connector CN3. Each of the second additional connecting part CP32 and the third additional connecting part CP33 has substantially the same structure as that of the first additional connecting part CP31. Thus, they will not be described in detail here for the sake of brevity.

Figure 4:
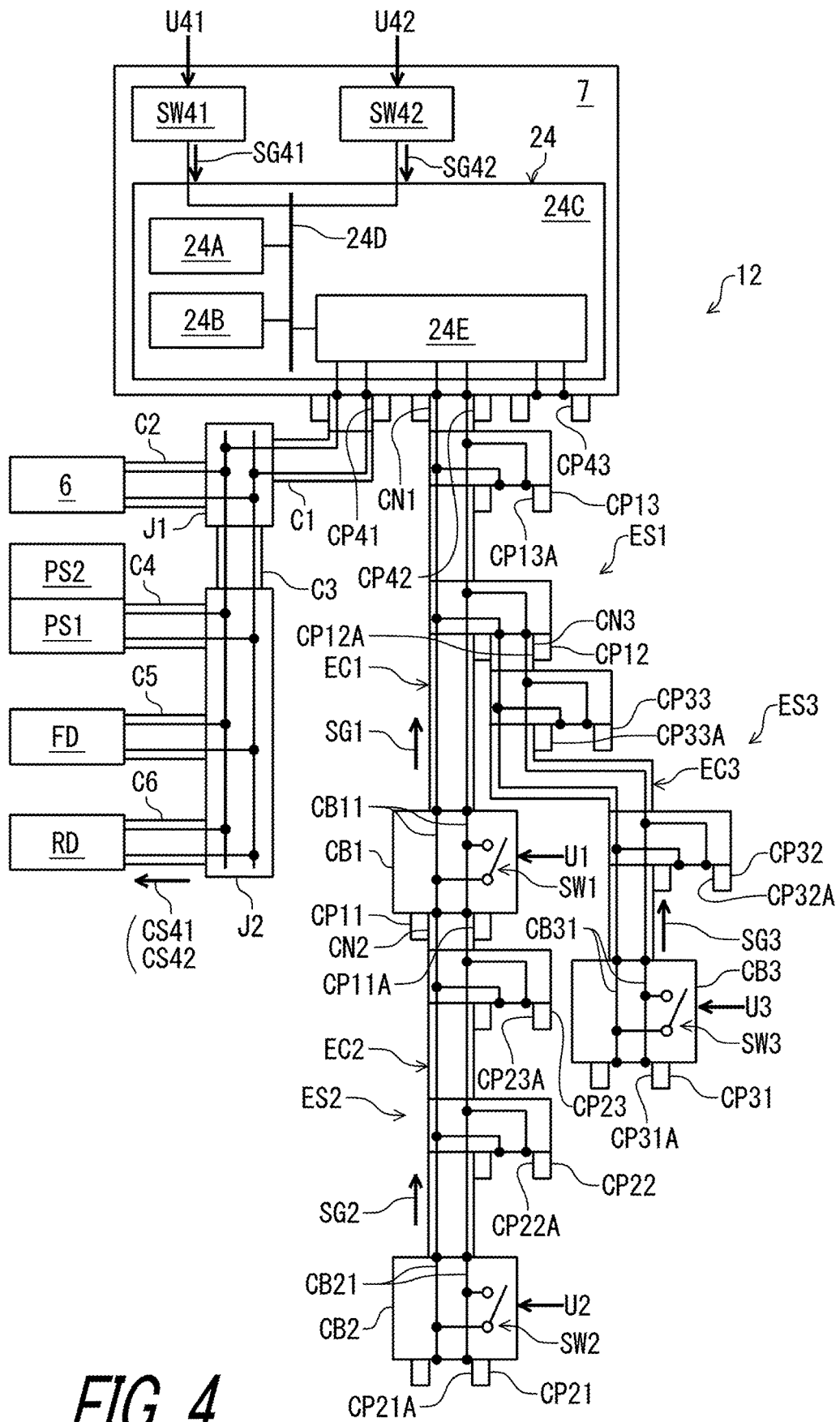
FIG. 4 is a block diagram of the human-powered vehicle illustrated in FIG. 1.

As seen in FIG. 4, the electrical switch device ES1 is configured to selectively transmit the signal SG1 from the electrical switch unit SW1 and the additional signal SG2 from the additional electrical switch device ES2 to the operating device 7 configured to operate the electric component RD. The electrical cable EC1 transmits the additional signal SG3 from the additional electrical switch device ES3 to the operating device 7. In this embodiment, the operating device 7 is configured to operate the electric component RD in response to each of the signal SG1 and the additional signal SG2. The operating device 7 is configured to operate the electric component RD in response to each of the signal SG1, the additional signal SG2, and the additional signal SG3. Thus, each of the electrical switch unit SW1, the additional electrical switch unit SW2, and the additional electrical switch unit SW2 is a satellite switch provided separately from the operating device 7.

The signal SG1 is configured to operate the electric component RD. For example, the signal SG1 includes an upshift control signal. Each of the additional signal SG2 and the additional signal SG3 includes the upshift control signal. The operating device 7 is configured to operate the electric component RD to upshift in response to each of the signal SG1, the additional signal SG2, and the additional signal SG3. However, the signal SG1 and the additional signals SG2 and SG3 are not limited to the upshift control signal. For example, the signal SG1 and the additional signals SG2 and SG3 can include another signal such as a downshift control signal, a seatpost control signal, or a suspension control signal.

As seen in FIG. 3, the connecting part CP11 is configured to electrically and detachably connect the additional electrical switch device ES2 to the electrical switch device ES1. In this embodiment, the connecting part CP11 includes a cable connection port CP11A to which the additional electrical cable EC2 is detachably coupled. The connecting part CP11 is configured to be coupled to the additional electrical cable EC2 of the additional electrical switch device ES2. The additional electrical switch device ES2 is detachable from the connecting part CP11 without substantial damage. The additional connector CN2 is electrically and detachably connected to the connecting part CP11. The additional connector CN2 is detachable from the connecting part CP11 without substantial damage. However, the connecting part CP11 can be configured not to be detachable from the additional electrical switch device ES2. In such an embodiment, the cable connection port CP11A can be omitted from the connecting part CP11. The connecting part CP11 can be omitted from the electrical switch device ES1. The connecting part CP11 can be coupled to the additional electrical switch device ES3 or other electrical devices.

The second connecting part CP12 is configured to electrically and detachably connect another electrical device (e.g., the additional electrical switch device ES2 or ES3) to the electrical switch device ES1. In this embodiment, the second connecting part CP12 includes a second cable connection port CP12A to which another electrical device is detachably coupled. However, the second connecting part CP12 can be configured not to be detachable from another electrical device. In such an embodiment, the second cable connection port CP12A can be omitted from the second connecting part CP12. The second connecting part CP12 can be omitted from the electrical switch device ES1.

The third connecting part CP13 is configured to electrically and detachably connect another electrical device (e.g., the additional electrical switch device ES2 or ES3) to the electrical switch device ES1. In this embodiment, the third connecting part CP13 includes a third cable connection port CP13A to which another electrical device is detachably coupled. However, the third connecting part CP13 can be configured not to be detachable from another electrical device. In such an embodiment, the third cable connection port CP13A can be omitted from the third connecting part CP13. The third connecting part CP13 can be omitted from the electrical switch device ES1.

As seen in FIG. 3, the additional connecting part CP21 is configured to electrically and detachably connect another electrical device (e.g., the electrical switch device ES1 or the additional electrical switch device ES3) to the additional electrical switch device ES2. In this embodiment, the additional connecting part CP21 includes an additional cable connection port CP21A to which another electrical cable is detachably coupled. The additional connecting part CP21 is configured to be coupled to another electrical cable of another electrical device. Another connector is electrically and detachably connected to the additional connecting part CP21. Another connector is detachable from the additional connecting part CP21 without substantial damage. However, the additional connecting part CP21 can be configured not to be detachable from another electrical device. In such an embodiment, the additional cable connection port CP21A can be omitted from the additional connecting part CP21. The additional connecting part CP21 can be omitted from the additional electrical switch device ES2.

The second additional connecting part CP22 is configured to electrically and detachably connect another electrical device (e.g., the electrical switch device ES1 or the additional electrical switch device ES3) to the additional electrical switch device ES2. In this embodiment, the second additional connecting part CP22 includes a second additional cable connection port CP22A to which another electrical device is detachably coupled. However, the second additional connecting part CP22 can be configured not to be detachable from another electrical device. In such an embodiment, the second additional cable connection port CP22A can be omitted from the second additional connecting part CP22. The second additional connecting part CP22 can be omitted from the additional electrical switch device ES2.

The third additional connecting part CP23 is configured to electrically and detachably connect another electrical device (e.g., the electrical switch device ES1 or the additional electrical switch device ES3) to the additional electrical switch device ES2. In this embodiment, the third additional connecting part CP23 includes a third additional cable connection port CP23A to which another electrical device is detachably coupled. However, the third additional connecting part CP23 can be configured not to be detachable from another electrical device. In such an embodiment, the third additional cable connection port CP23A can be omitted from the third additional connecting part CP23. The third additional connecting part CP23 can be omitted from the additional electrical switch device ES2.

As seen in FIG. 3, the additional connecting part CP31 is configured to electrically and detachably connect another electrical device (e.g., the electrical switch device ES1 or the additional electrical switch device ES2) to the additional electrical switch device ES3. In this embodiment, the additional connecting part CP31 includes an additional cable connection port CP31A to which another electrical cable is detachably coupled. The additional connecting part CP31 is configured to be coupled to another electrical cable of another electrical device. Another connector is electrically and detachably connected to the additional connecting part CP31. Another connector is detachable from the additional connecting part CP31 without substantial damage. However, the additional connecting part CP31 can be configured not to be detachable from another electrical device. In such an embodiment, the additional cable connection port CP31A can be omitted from the additional connecting part CP31. The additional connecting part CP31 can be omitted from the additional electrical switch device ES3.

The second additional connecting part CP32 is configured to electrically and detachably connect another electrical device (e.g., the electrical switch device ES1 or the additional electrical switch device ES2) to the additional electrical switch device ES3. In this embodiment, the second additional connecting part CP32 includes a second additional cable connection port CP32A to which another electrical device is detachably coupled. However, the second additional connecting part CP32 can be configured not to be detachable from another electrical device. In such an embodiment, the second additional cable connection port CP32A can be omitted from the second additional connecting part CP32. The second additional connecting part CP32 can be omitted from the additional electrical switch device ES3.

The third additional connecting part CP33 is configured to electrically and detachably connect another electrical device (e.g., the electrical switch device ES1 or the additional electrical switch device ES2) to the additional electrical switch device ES3. In this embodiment, the third additional connecting part CP33 includes a third additional cable connection port CP33A to which another electrical device is detachably coupled. However, the third additional connecting part CP33 can be configured not to be detachable from another electrical device. In such an embodiment, the third additional cable connection port CP33A can be omitted from the third additional connecting part CP33. The third additional connecting part CP33 can be omitted from the additional electrical switch device ES3.

As seen in FIG. 4, the electrical switch unit SW1 is configured to be electrically connected to the connecting part CP11 and the electrical cable EC1. The connecting part CP11 is configured to be electrically connected to the electrical cable EC1. In this embodiment, the electrical switch device ES1 comprises a circuit board CB1. The electrical switch unit SW1 is electrically mounted on the circuit board CB1. Each of the connecting part CP11 and the electrical cable EC1 is electrically connected to the circuit board CB1. The circuit board CB1 includes a conductor CB11. The electrical switch unit SW1, the connecting part CP11, and the electrical cable EC1 are electrically connected to each other with the conductor CB11 of the circuit board CB1. The electrical cable EC1 is electrically connected to the connector CN1. Thus, the electrical cable EC1 and the connector CN1 transmits the signal SG1 from the electrical switch unit SW1 to the operating device 7 in a state where the electrical switch device ES1 is electrically connected to the operating device 7.

The electrical cable EC1 is electrically connected to the additional electrical switch device ES2 to transmit the additional signal SG2 to the operating device 7. In this embodiment, the additional electrical switch device ES2 comprises an additional circuit board CB2. The additional electrical switch unit SW2 is electrically mounted on the additional circuit board CB2. Each of the additional connecting part CP21 and the additional electrical cable EC2 is electrically connected to the additional circuit board CB2. The additional circuit board CB2 includes an additional conductor CB21. The additional electrical switch unit SW2, the additional connecting part CP21, and the additional electrical cable EC2 are electrically connected to each other with the additional conductor CB21 of the additional circuit board CB2. The additional electrical cable EC2 is electrically connected to the additional connector CN2. Thus, the additional electrical cable EC2 and the additional connector CN2 transmits the additional signal SG2 from the additional electrical switch unit SW2 to the electrical switch device ES1 in a state where the additional connector CN2 is coupled to the cable connection port CP11A of the connecting part CP11. Namely, the connecting part CP11, the electrical cable EC1, and the connector CN1 transmits the additional signal SG2 to the operating device 7 in the state where the additional connector CN2 is coupled to the cable connection port CP11A of the connecting part CP11.

The electrical cable EC1 is electrically connected to the additional electrical switch device ES3 to transmit the additional signal SG3 to the operating device 7. In this embodiment, the additional electrical switch device ES3 comprises an additional circuit board CB3. The additional electrical switch unit SW3 is electrically mounted on the additional circuit board CB3. Each of the additional connecting part CP31 and the additional electrical cable EC3 is electrically connected to the additional circuit board CB3. The additional circuit board CB3 includes an additional conductor CB31. The additional electrical switch unit SW3, the additional connecting part CP31, and the additional electrical cable EC3 are electrically connected to each other with the additional conductor CB31 of the additional circuit board CB3. The additional electrical cable EC3 is electrically connected to the additional connector CN3. Thus, the additional electrical cable EC3 and the additional connector CN3 transmits the additional signal SG3 from the additional electrical switch unit SW3 to the electrical cable EC1 of the electrical switch device ES1 in a state where the additional connector CN3 is coupled to the third cable connection port CP13A of the third connecting part CP13. Namely, the third connecting part CP13, the electrical cable EC1, and the connector CN1 transmits the additional signal SG3 to the operating device 7 in the state where the additional connector CN3 is coupled to the third cable connection port CP13A of the third connecting part CP13.

Figure 5:
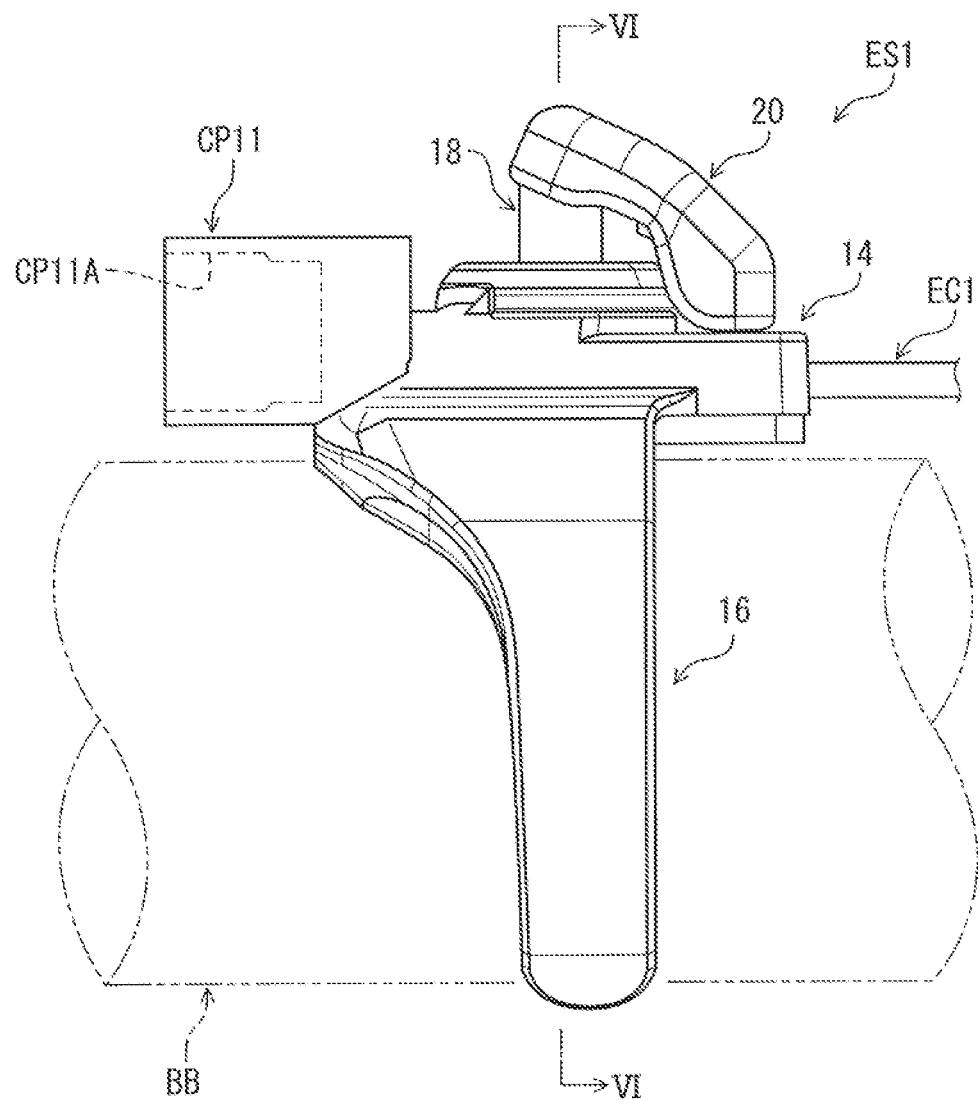
FIG. 5 is a side elevational view of the electrical switch device illustrated in FIG. 3.

As seen in FIG. 5, the electrical switch device ES1 further comprises a base structure 14, a mounting structure 16, a push button 18, and a push button cover 20. The mounting structure 16 is configured to couple the base structure 14 to the bicycle body BB. The connecting part CP11 is mounted on the base structure 14. The electrical cable EC1 extends from the base structure 14 toward an opposite side of the connecting part CP11 with respect to the base structure 14.

Figure 6:
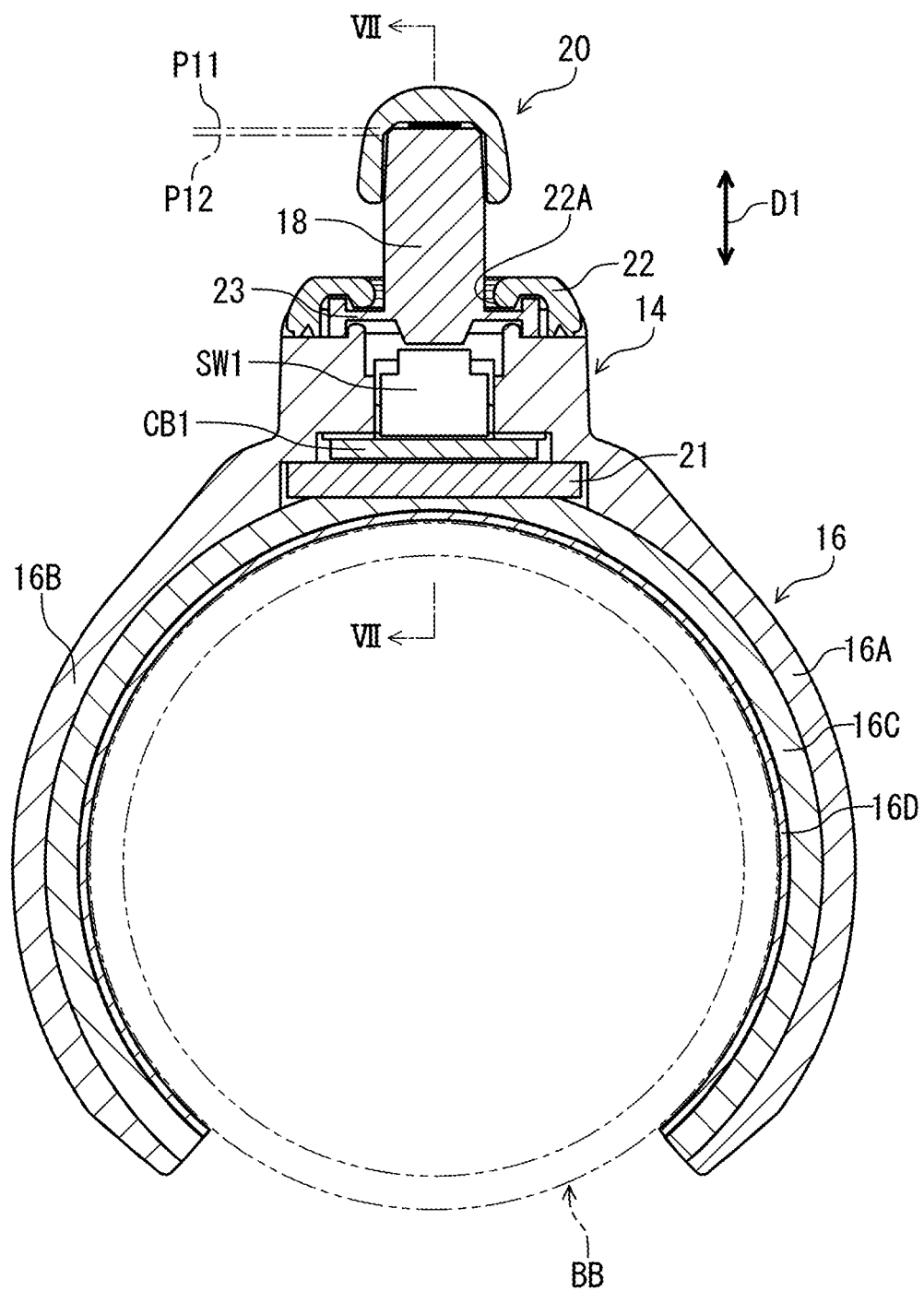
FIG. 6 is a cross-sectional view of the electrical switch device taken along line VI-VI of FIG. 5.

As seen in FIG. 6, the mounting structure 16 extends from the base structure 14. The mounting structure 16 includes a first arm 16A and a second arm 16B. The first arm 16A and the second arm 16B extend from the base structure 14 to couple the base structure 14 to a tubular part such as the bicycle frame BB1 or the handlebar BB2 of the bicycle body BB. Each of the first arm 16A and the second arm 16B has a curved shape.

The mounting structure 16 includes an intermediate part 16C and a contact part 16D. The intermediate part 16C is attached to the first arm 16A and the second arm 16B with a fastening structure such as adhesive. The contact part 16D is attached to the intermediate part 16C with a fastening structure such as adhesive. Each of the intermediate part 16C and the contact part 16D has a curved shape.

The electrical switch device ES1 further comprises a support plate 21. The support plate 21 is provided between the base structure 14 and the intermediate part 16C. The circuit board CB1 is provided between the electrical switch unit SW1 and the support plate 21.

The push button 18 is movably coupled to the base structure 14. The push button 18 is contactable with the electrical switch unit SW1. The push button 18 is movable relative to the base structure 14 from a rest position P11 to an operated position P12. The push button 18 is spaced apart from the electrical switch unit SW1 in a rest state where the push button 18 is in the rest position P11. The push button 18 is in contact with the electrical switch unit SW1 in an operated state where the push button 18 is in the operated position P12. Thus, the electrical switch unit SW1 is turned off not to generate the signal SG1 in the rest state. The electrical switch unit SW1 is turned on to generate the signal SG1 in the operated state.

The electrical switch device ES1 further comprises a lock ring 22 and a flexible flange 23. The lock ring 22 couples the push button 18 to the base structure 14 to be movable relative to the base structure 14 from the rest position P11 to the operated position P12. The lock ring 22 is secured to the base structure 14. The push button 18 has a columnar shape and extends through an opening 22A of the lock ring 22. The push button 18 is movable relative to the base structure 14 from the rest position P11 to the operated position P12 in a movement direction D1. The flexible flange 23 has an annular shape and radially outwardly extends from the push button 18. The flexible flange 23 is deformable in the movement direction D1. The flexible flange 23 is attached to the base structure 14 to movably support the push button 18. The flexible flange 23 is provided between the lock ring 22 and the base structure 14. The lock ring 22 and the base structure 14 hold the flexible flange 23.

Figure 7:
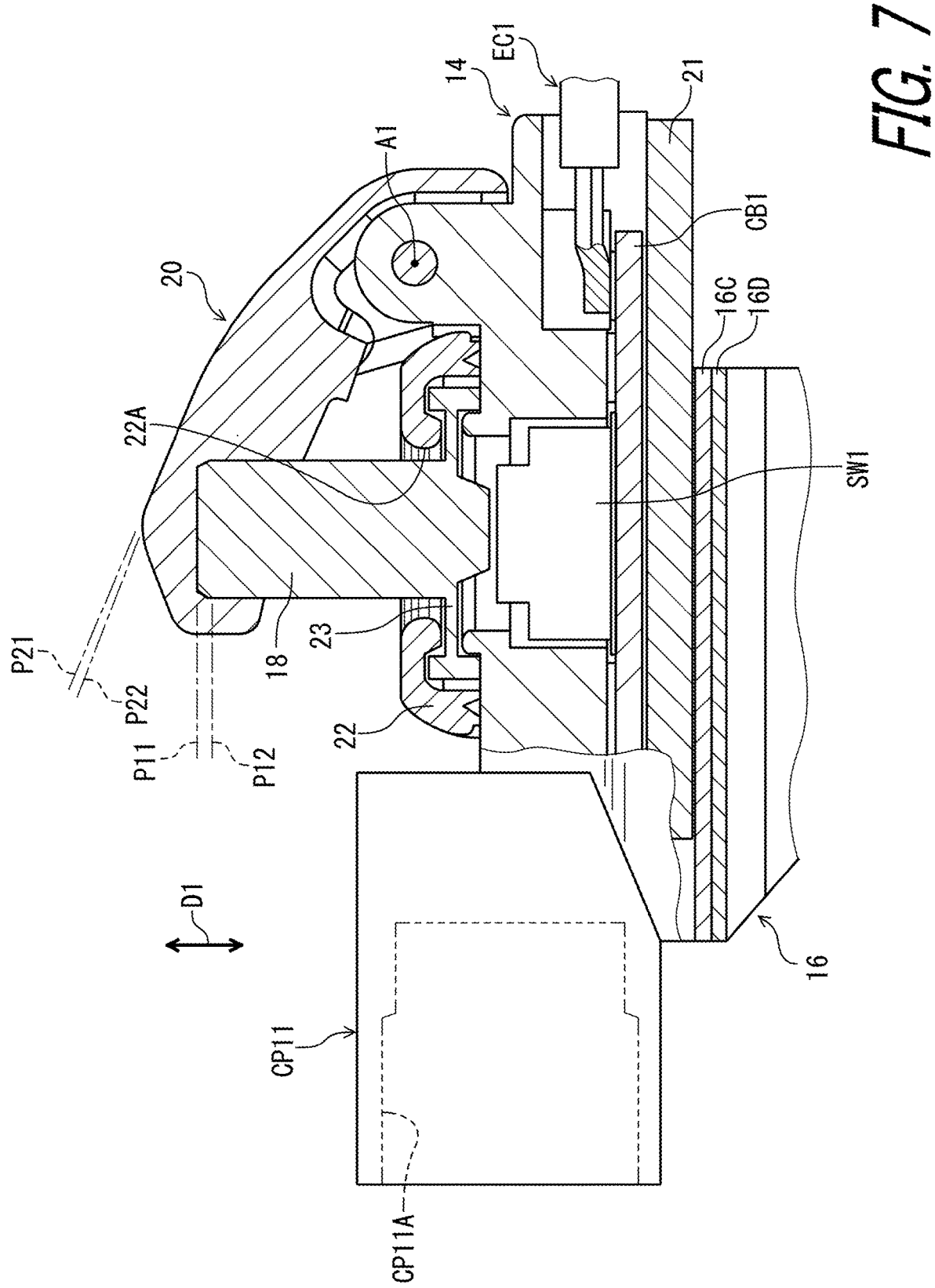
FIG. 7 is a cross-sectional view of the electrical switch device taken along line VII-VII of FIG. 6.

As seen in FIG. 7, the push button cover 20 is attached to an end of the push button 18. The push button cover 20 is pivotally coupled to the base structure 14 about a pivot axis A1. The push button cover 20 is pivotable relative to the base structure 14 from an initial position P21 to an actuated position P22. The initial position P21 of the push button cover 20 corresponds to the rest position P11 of the push button 18. The actuated position P22 of the push button cover 20 corresponds to the operated position P12 of the push button 18.

The electrical switch unit SW1 is electrically mounted on the circuit board CB1. The circuit board CB1 is secured to the base structure 14. The electrical switch unit SW1 is turned on to generate the signal SG1 while the user presses the push button cover 20 from the initial position P21 toward the actuated position P22. Elastic force of the flexible flange 23 of the push button 18 respectively returns the push button 18 and the push button cover 20 to the rest position P11 and the initial position P21 when the user releases operation force from the push button cover 20. The electrical switch unit SW1 is turned off not to generate the signal SG1 while the user does not press the push button cover 20.

In this embodiment, the additional electrical switch devices ES2 and ES3 have substantially the same structure as that of the electrical switch device ES1. Thus, they will not be described in detail here for the sake of brevity. The structure (e.g., shape and/or arrangement of each element) of each of the electrical switch device ES1 and the additional electrical switch devices ES2 and ES3 is not limited to the structure illustrated in FIGS. 5 to 7. The electrical switch device ES1 and the additional electrical switch devices ES2 and ES3 can have a structure other than the structure illustrated in FIGS. 5 to 7.

As seen in FIG. 3, the operating device 7 comprises a base member 7A and an operating member 7B. The operating member 7B is pivotally coupled to the base member 7A to operate the front brake device B2 (FIG. 1). The operating device 7 further comprises a first electrical switch SW41 and a second electrical switch SW42. In this embodiment, the first electrical switch SW41 and the second electrical switch SW42 are provided on the operating member 7B. However, the first electrical switch SW41 and the second electrical switch SW42 can be provided on other members such as the base member 7A. While each of the first electrical switch SW41 and the second electrical switch SW42 includes a normally-open switch in this embodiment, other type of switches can apply to each of the first electrical switch SW41 and the second electrical switch SW42.

As seen in FIG. 4, the first electrical switch SW41 is configured to generate a first operation signal SG41 in response to a first user input U41. The second electrical switch SW42 is configured to generate a second operation signal SG42 in response to a second user input U42. The electric component RD shifts the chain C between a plurality of rear gear positions of the rear multiple sprocket 5 in response to each of the first operation signal SG41 and the second operation signal SG42.

In this embodiment, the first operation signal SG41 includes an upshift operation signal, and the second operation signal SG42 includes a downshift operation signal. However, the first operation signal SG41 and the second operation signal SG42 are not limited to the shift operation signal. For example, the first operation signal SG41 and the second operation signal SG42 can include another signal such as a seatpost operation signal and a suspension operation signal.

The operating device 6, the operating device 7, the electric component FD, and the electric component RD communicate with each other using power line communication (PLC). The PLC carries data on a conductor that is also used simultaneously for electric power transmission or electric power distribution to electric components. The PLC uses unique identifying information such as a unique identifier that is assigned to each of the operating devices 6 and 7 and the electric components FD and RD. Based on the unique identifying information, each of the operating devices 6 and 7 and the electric components FD and RD can recognize control signals which are necessary for itself among control signals transmitted via the electrical communication path PT.

As seen in FIG. 4, the operating device 7 further comprises a PLC controller 24. The PLC controller 24 is electrically connected to the first electrical switch SW41 to generate a first control signal CS41 in response to the first operation signal SG41 from the first electrical switch SW41. The PLC controller 24 is electrically connected to the second electrical switch SW42 to generate a second control signal CS42 in response to the second operation signal SG42 from the second electrical switch SW42. In this embodiment, the PLC controller 24 is provided on the base member 7A. However, the PLC controller 24 can be provided on another member such as the operating member 7B. The first control signal CS41 can also be referred to as a signal CS41. The second control signal CS42 can also be referred to as a signal CS42.

The PLC controller 24 is configured to transmit the first control signal CS41 or the second control signal CS42 to the electric component RD using the PLC. In this embodiment, the PLC controller 24 includes a processor 24A, a memory 24B, a circuit board 24C, a bus 24D, and a PLC circuit 24E. The processor 24A, the memory 24B, the bus 24D, and the PLC circuit 24E are electrically mounted on the circuit board 24C and are electrically connected to a conductor of the circuit board 24C. The processor 24A and the memory 24B are electrically connected to each other with the circuit board 24C and the bus 24D. Thus, the PLC controller 24 can also be referred to as PLC control circuitry 24 in the present application.

The processor 24A includes a central processing unit (CPU) and a memory controller. The memory 24B includes a read only memory (ROM) and a random-access memory (RAM). The ROM includes a non-transitory computer-readable storage medium. The RAM includes a transitory computer-readable storage medium. The memory 24B includes storage areas each having an address in the ROM and the RAM. The processor 24A controls the memory 24B to store data in the storage areas of the memory 24B and reads data from the storage areas of the memory 24B. The memory 24B (e.g., the ROM) stores a program. The program is read into the processor 24A, and thereby algorithm of the PLC controller 24 is performed.

The PLC circuit 24E is configured to separate input signals to a power source voltage and control signals. The PLC circuit 24E is configured to regulate the power source voltage to a level at which the PLC circuit 24E can properly operate. The PLC circuit 24E is configured to superimpose output signals (e.g., the first control signal CS41 and the second control signal C S42) on the power source voltage applied from the battery PS2 to the electrical communication path PT. The PLC circuit 24E is configured to generate the first control signal CS41 in response to each of the first operation signal SG41, the signal SG1, the additional signal SG2, and the additional signal SG3. The PLC circuit 24E is configured to generate the second control signal CS42 in response to the second operation signal SG42.

As seen in FIG. 4, the operating device 7 includes a first connection port CP41, a second connection port CP42, and a third connection port CP43. The first connection port CP41, the second connection port CP42, and the third connection port CP43 are electrically connected to the PLC circuit 24E. The first to third connection ports CP41 to CP43 have substantially the same structure as each other. The first connection port CP41, the second connection port CP42, and the third connection port CP43 can also be respectively referred to as connecting parts CP41, CP42, and CP43.

The PLC controller 24 is configured to separately recognize the first to third connection ports CP41 to CP43. For example, the PLC controller 24 is configured to recognize the second connection port CP42 as a connection port for an upshift operation signal. Thus, the PLC circuit 24E is configured to recognize, as an upshift operation signal, the signal SG1, the additional signal SG2, and the additional signal SG3 in a state where the connector CN1 of the electrical switch device ES1 is electrically connected to the second connection port CP42.

The PLC controller 24 is configured to recognize the first connection port CP41 and the third connection port CP43 as a connection port for the PLC. Thus, the PLC controller 24 is configured to communicate with the operating device 6, the electric component FD, and the electric component RD using the PLC in a state where the electrical communication path PT is electrically connected to one of the first connection port CP41 and the third connection port CP43.

The operating device 6 has substantially the same structure as that of the operating device 7 except that the operating device 6 transmits control signals to the electric component FD to upshift or downshift. Thus, it will not be described in detail here for the sake of brevity.

As seen in FIG. 4, the signal SG1 is transmitted from the electrical switch unit SW1 to the operating device 7 through the electrical cable EC1 and the connector CN1 when the electrical switch unit SW1 is pressed. The additional signal SG2 is transmitted from the additional electrical switch unit SW2 to the operating device 7 through the additional electrical cable EC2, the additional connector CN2, the connecting part CP11, the electrical cable EC1, and the connector CN1 when the additional electrical switch unit SW2 is pressed. The additional signal SG3 is transmitted from the additional electrical switch unit SW3 to the operating device 7 through the additional electrical cable EC3, the additional connector CN3, the third connecting part CP13, the electrical cable EC1, and the connector CN1 when the additional electrical switch unit SW3 is pressed. The PLC controller 24 transmits the first control signal CS41 to the electric component RD through the electrical communication path PT in response to each of the signal SG1, the additional signal SG2, and the additional signal SG3. The PLC controller 24 transmits the first control signal CS41 to the electric component RD through the electrical communication path PT in response to the first operation signal SG41 generated by the first electrical switch SW41. The PLC controller 24 transmits the second control signal CS42 to the electric component RD through the electrical communication path PT in response to the second operation signal SG42 generated by the second electrical switch SW42.

Second Embodiment

An operating system 212 for the human-powered vehicle 10 including an electrical switch device ES21 in accordance with a second embodiment will be described below referring to FIGS. 8 and 9. The electrical switch device ES21 has substantially the same structure as that of the electrical switch device ES1 except for the electrical cable EC1 and the connector CN1. Thus, elements having substantially the same function as those in the first embodiment will be numbered the same here and will not be described and/or illustrated again in detail here for the sake of brevity.

Figure 8:
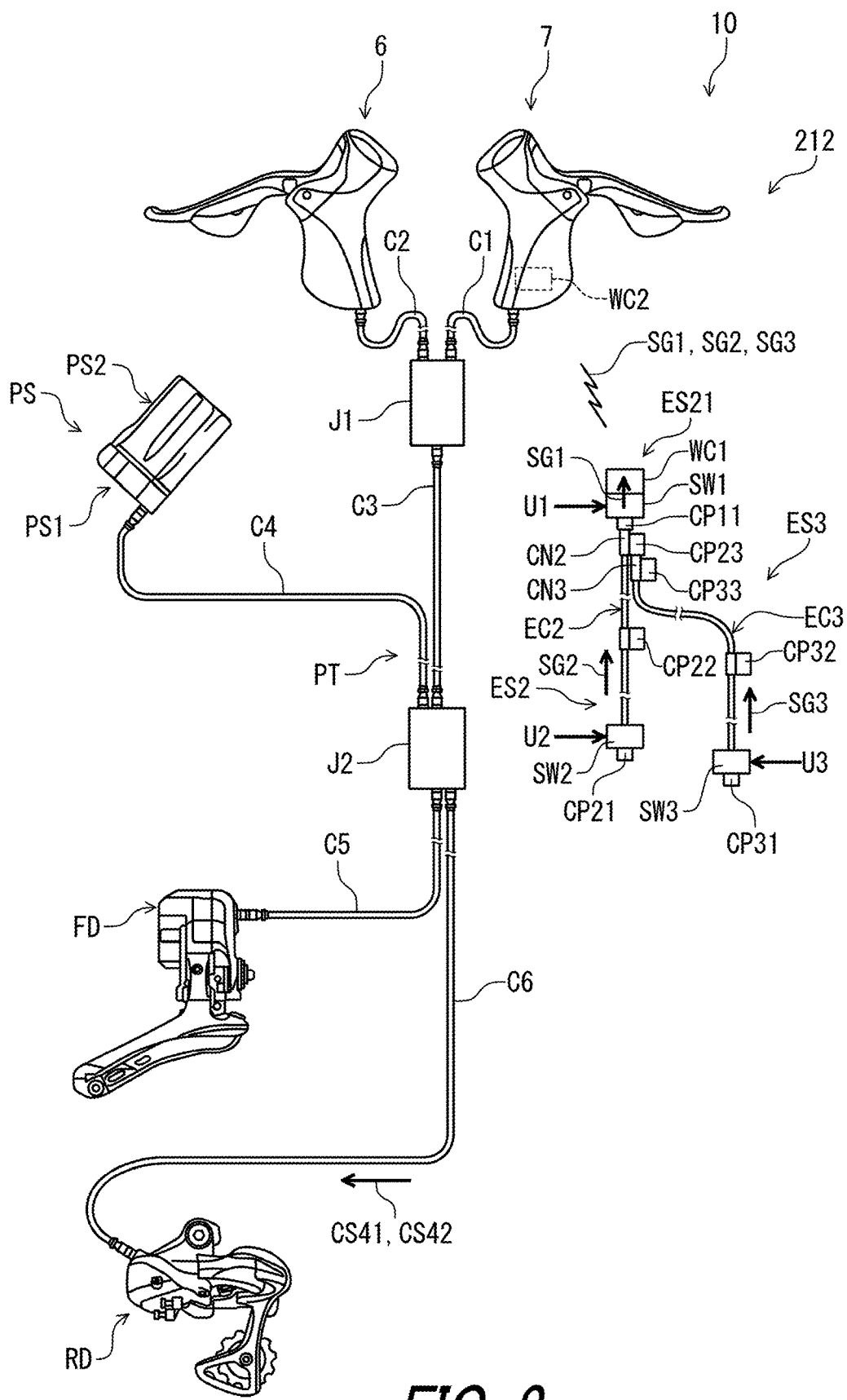
FIG. 8 is a schematic diagram of the human-powered vehicle including an operating system in accordance with a second embodiment.
Figure 9:
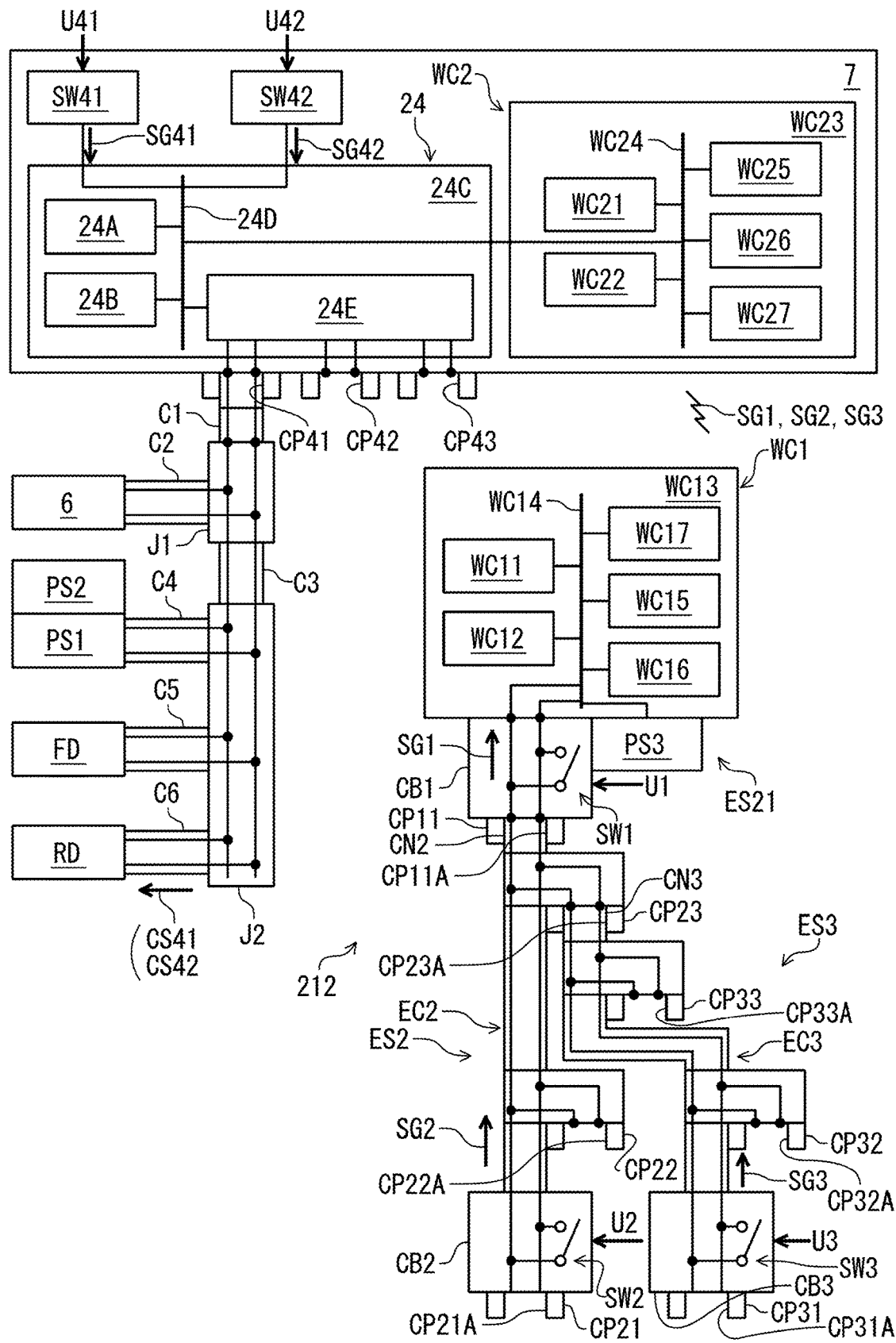
FIG. 9 is a block diagram of the human-powered vehicle illustrated in FIG. 8.

As seen in FIG. 8, in the operating system 212, the electrical switch device ES21 comprises the electrical switch unit SW1 and the connecting part CP11. The electrical switch device ES21 for the human-powered vehicle 10 comprises a wireless communicator WC1. The wireless communicator WC1 is configured to wirelessly transmit the signal SG1 to the operating device 7 configured to operate the electric component RD. The electrical cable EC1 and the connector CN1 are omitted from the electrical switch device ES21.

The wireless communicator WC1 includes a processor WC11, a memory WC12, a circuit board WC13, a bus WC14, a signal transmitting circuit WC15, a signal receiving circuit WC16, and an antenna WC17. The processor WC11, the memory WC12, the bus WC14, the signal transmitting circuit WC15, the signal receiving circuit WC16, and the antenna WC17 are electrically mounted on the circuit board WC13 and are electrically connected to a conductor of the circuit board WC13. The processor WC11, the memory WC12, the signal transmitting circuit WC15, the signal receiving circuit WC16, and the antenna WC17 are electrically connected to each other with the circuit board WC13 and the bus WC14. Thus, the wireless communicator WC1 can also be referred to as wireless communication circuitry WC1 in the present application. The circuit board WC13 of the wireless communicator WC1 is electrically connected to the circuit board CB1 of the electrical switch device ES21. Thus, the electrical switch unit SW1 and the connecting part CP11 are electrically connected to the wireless communicator WC1.

The processor WC11 includes a CPU and a memory controller. The memory WC12 includes a ROM and a RAM. The ROM includes a non-transitory computer-readable storage medium. The RAM includes a transitory computer-readable storage medium. The memory WC12 includes storage areas each having an address in the ROM and the RAM. The processor WC11 controls the memory WC12 to store data in the storage areas of the memory WC12 and reads data from the storage areas of the memory WC12. The memory WC12 (e.g., the ROM) stores a program. The program is read into the processor WC11, and thereby algorithm of the wireless communicator WC1 is performed.

The processor WC11 is configured to control the signal transmitting circuit WC15 to generate a wireless signal SG1 via the antenna WC17 in response to the signal SG1 of the electrical switch unit SW1. In this embodiment, the signal transmitting circuit WC15 can encrypt control information (e.g., shift information or unique identifying information) to generate encrypted wireless signals SG1. The signal transmitting circuit WC15 encrypts digital signals stored in the memory WC12 using a cryptographic key. The signal transmitting circuit WC15 transmits the encrypted wireless signals SG1. Thus, the wireless communicator WC1 wirelessly transmits the signal SG1 to the operating device 7 when the user operates the electrical switch unit SW1.

Further, the processor WC11 is configured to control the signal receiving circuit WC16 to receive a wireless signal from the operating device 7 via the antenna WC17. In this embodiment, the signal receiving circuit WC16 decodes the wireless signal to recognize information (e.g., unique identifying information) wirelessly transmitted from the operating device 7. The signal receiving circuit WC16 may decrypt the encrypted wireless signal using the cryptographic key. Namely, the wireless communicator WC1 is configured to transmit a wireless signal to the operating device 7 and to receive a wireless signal to recognize information from the operating device 7. In other words, the wireless communicator WC1 is provided as a wireless transmitter and a wireless receiver. In this embodiment, the wireless communicator WC1 is integrally provided as a single module or unit. However, the wireless communicator WC1 can be constituted of a wireless transmitter and a wireless receiver which are provided as separate modules or units arranged at different positions from each other. The signal receiving circuit WC16 can be omitted from the wireless communicator WC1.

The wireless communicator WC1 is configured to wirelessly and selectively transmit the signal SG1 and the additional signal SG2 to operate the electric component RD. The wireless communicator WC1 is configured to wirelessly and selectively transmit the signal SG1 and the additional signal SG2 to the operating device 7. The wireless communicator WC1 is configured to wirelessly and selectively transmit the signal SG1, the additional signal SG2, and the additional signal SG3 to the operating device 7.

The wireless communicator WC1 receives the additional signal SG2 from the additional electrical switch device ES2 in a state where the additional electrical switch device ES2 is electrically connected to one of the connection parts CP11 to CP13. The processor WC11 is configured to control the signal transmitting circuit WC15 to generate an additional wireless signal SG2 via the antenna WC17 in response to the additional signal SG2 of the additional electrical switch unit SW2. Thus, the wireless communicator WC1 wirelessly transmits the additional signal SG2 to the operating device 7 when the user operates the additional electrical switch unit SW2.

The wireless communicator WC1 receives the additional signal SG3 from the additional electrical switch device ES3 in a state where the additional electrical switch device ES3 is electrically connected to one of the connecting parts CP11 to CP13. The processor WC11 is configured to control the signal transmitting circuit WC15 to generate an additional wireless signal SG3 via the antenna WC17 in response to the additional signal SG3 of the additional electrical switch unit SW3. Thus, the wireless communicator WC1 wirelessly transmits the additional signal SG3 to the operating device 7 when the user operates the additional electrical switch unit SW3.

The operating device 7 includes a wireless communicator WC2. The wireless communicator WC2 includes a processor WC21, a memory WC22, a circuit board WC23, a bus WC24, a signal transmitting circuit WC25, a signal receiving circuit WC26, and an antenna WC27. The processor WC21, the memory WC22, the bus WC24, the signal transmitting circuit WC25, the signal receiving circuit WC26, and the antenna WC27 are electrically mounted on the circuit board WC23 and are electrically connected to a conductor of the circuit board WC23. The processor WC21, the memory WC22, the signal transmitting circuit WC25, the signal receiving circuit WC26, and the antenna WC27 are electrically connected to each other with the circuit board WC23 and the bus WC24. Thus, the wireless communicator WC2 can also be referred to as wireless communication circuitry WC2 in the present application.

The wireless communicator WC2 is configured to wirelessly receive the wireless signal SG1, the additional wireless signal SG2, and the additional wireless signal SG3. The wireless communicator WC2 has substantially the same structure as that of the wireless communicator WC1 of the electrical switch device ES1. Thus, it will not be described in detail here for the sake of brevity.

The electrical switch device ES21 further comprises a power source PS3. The power source PS3 is electrically connected to the wireless communicator WC1 to supply electric power to the wireless communicator WC1. Examples of the power source PS3 include a battery and an electric generator. Examples of the battery include a primary battery (e.g., a dry-cell battery) and a secondary battery (e.g., a rechargeable battery such as a rechargeable lithium-ion battery). Examples of the electric generator include a piezoelectric element to convert the physical change (e.g., pressure and/or vibration) of the electrical switch device ES21 to the electric power.

Third Embodiment

An operating system 312 for the human-powered vehicle 10 including an electrical switch device ES31 in accordance with a third embodiment will be described below referring to FIGS. 10 and 11. The electrical switch device ES31 has substantially the same structure as that of the electrical switch device ES1 except for the connecting part CP11. Thus, elements having substantially the same function as those in the above embodiments will be numbered the same here and will not be described and/or illustrated again in detail here for the sake of brevity.

Figure 10:
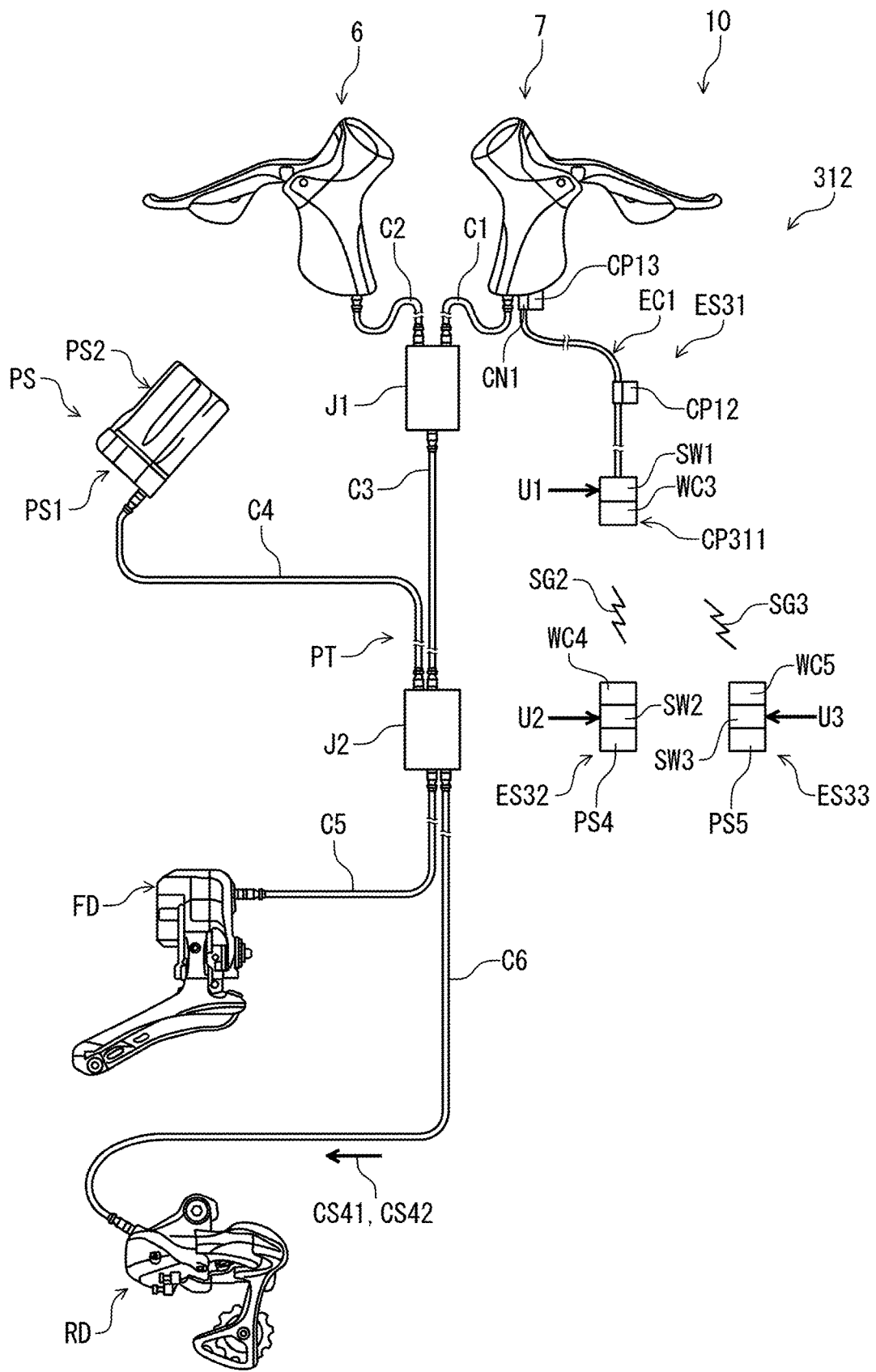
FIG. 10 is a schematic diagram of the human-powered vehicle including an operating system in accordance with a third embodiment.

As seen in FIG. 10, the electrical switch device ES31 for the human-powered vehicle 10 comprises the electrical switch unit SW1 and a connecting part CP311. The connecting part CP311 is provided on the electrical switch unit SW1 so as to electrically connect an additional electrical switch device ES32 to the electrical switch device ES31. The electrical switch device ES31 is configured to selectively transmit the signal SG1 from the electrical switch unit SW1 and the additional signal SG2 from the additional electrical switch device ES32 to the operating device 7 configured to operate the electric component RD.

Figure 11:
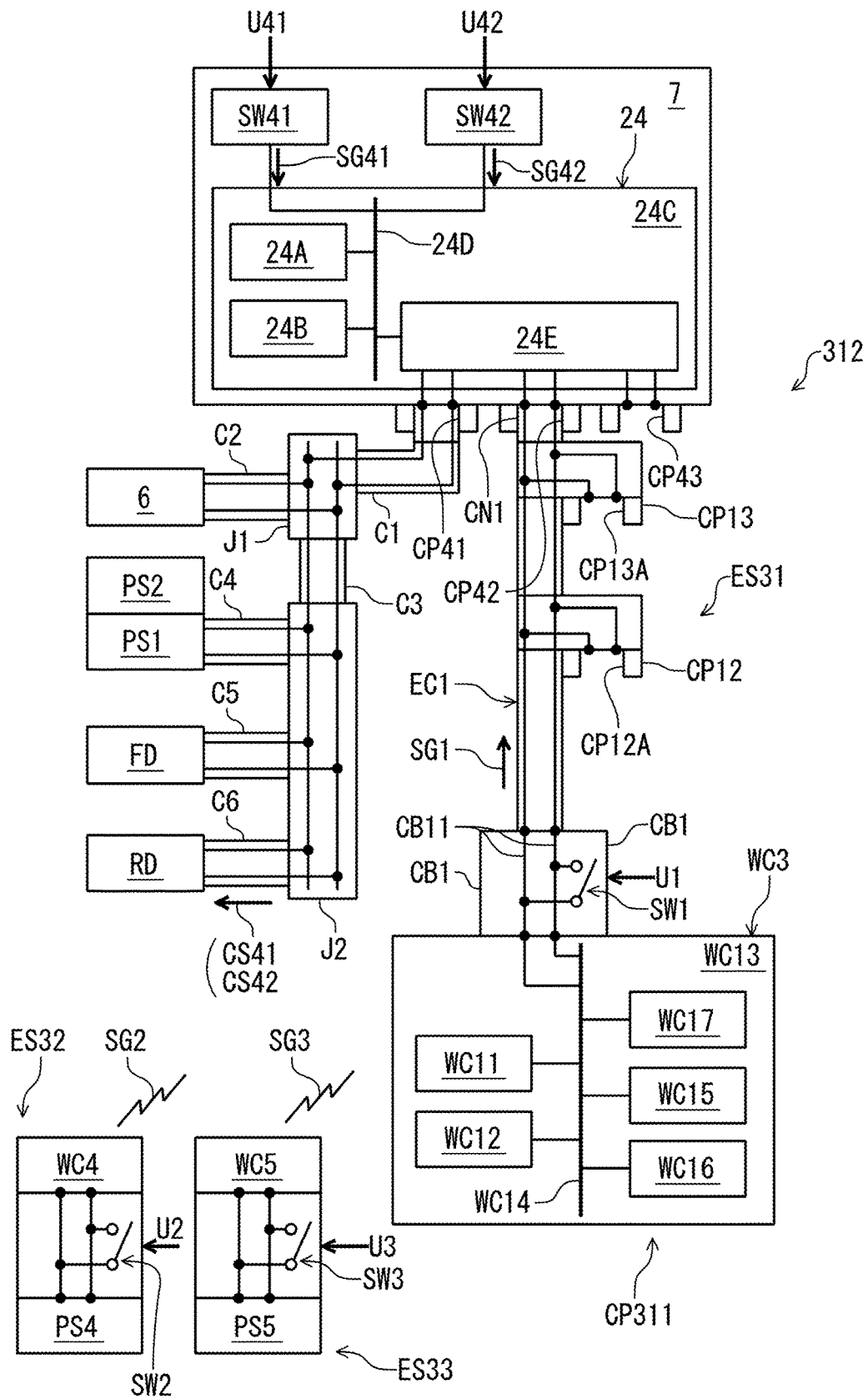
FIG. 11 is a block diagram of the human-powered vehicle illustrated in FIG. 10.

As seen in FIG. 11, the connecting part CP311 includes an additional wireless communicator WC3 configured to wirelessly receive the additional signal SG2. The additional wireless communicator WC3 has the same structure as that of the wireless communicator WC1 of the electrical switch device ES21 of the second embodiment. Thus, it will not be described in detail here for the sake of brevity.

The operating system 312 comprises the additional electrical switch device ES32. The additional electrical switch device ES32 includes the additional electrical switch unit SW2, a second additional wireless communicator WC4, and a second power source PS4. The second additional wireless communicator WC4 is electrically connected to the additional electrical switch unit SW2 to wirelessly transmit the additional signal SG2 to the additional wireless communicator WC3. The second power source PS4 is electrically connected to the second additional wireless communicator WC4 to supply electric power to the second additional wireless communicator WC4. The second additional wireless communicator WC4 has the same structure as that of the wireless communicator WC1 of the electrical switch device ES21 of the second embodiment. The second power source PS4 has the same structure as that of the power source PS3 of the electrical switch device ES21 of the second embodiment. Thus, they will not be described in detail here for the sake of brevity.

The operating system 312 comprises an additional electrical switch device ES33. The additional electrical switch device ES33 includes the additional electrical switch unit SW3, a third additional wireless communicator WC5, and a third power source PS5. The third additional wireless communicator WC5 is electrically connected to the additional electrical switch unit SW3 to wirelessly transmit the additional signal SG3 to the additional wireless communicator WC3. The third power source PS5 is electrically connected to the third additional wireless communicator WC5 to supply electric power to the third additional wireless communicator WC5. The third additional wireless communicator WC5 has the same structure as that of the wireless communicator WC1 of the electrical switch device ES21 of the second embodiment. The third power source PS5 has the same structure as that of the power source PS3 of the electrical switch device ES21 of the second embodiment. Thus, they will not be described in detail here for the sake of brevity.

Fourth Embodiment

An operating system 412 for the human-powered vehicle 10 including an electrical switch device ES41 in accordance with a fourth embodiment will be described below referring to FIGS. 12 and 13. The electrical switch device ES41 has substantially the same structure as that of the electrical switch device ES21 except for the connecting part CP11. Thus, elements having substantially the same function as those in the above embodiments will be numbered the same here and will not be described and/or illustrated again in detail here for the sake of brevity.

Figure 12:
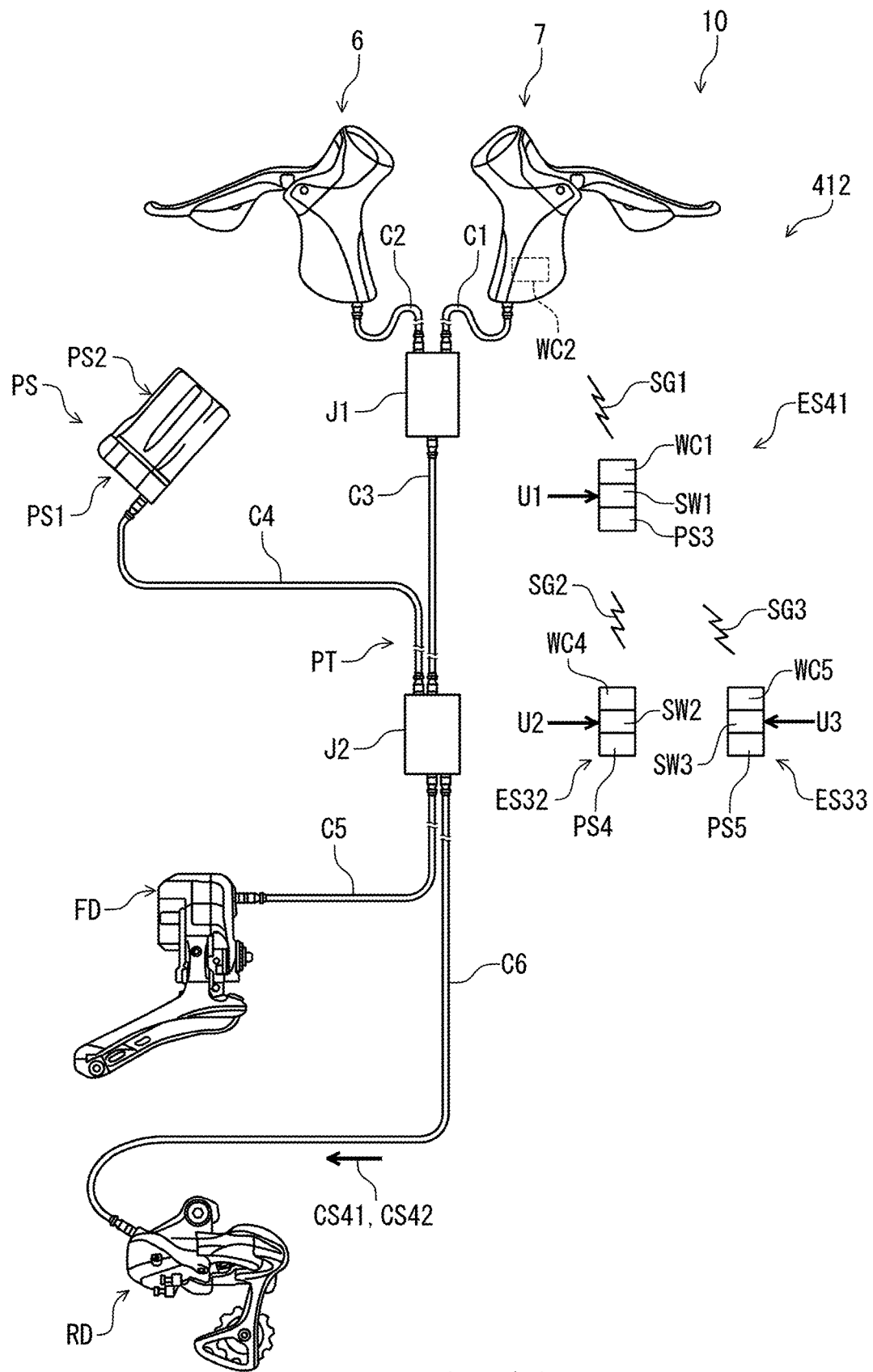
FIG. 12 is a schematic diagram of the human-powered vehicle including an operating system in accordance with a fourth embodiment.
Figure 13:
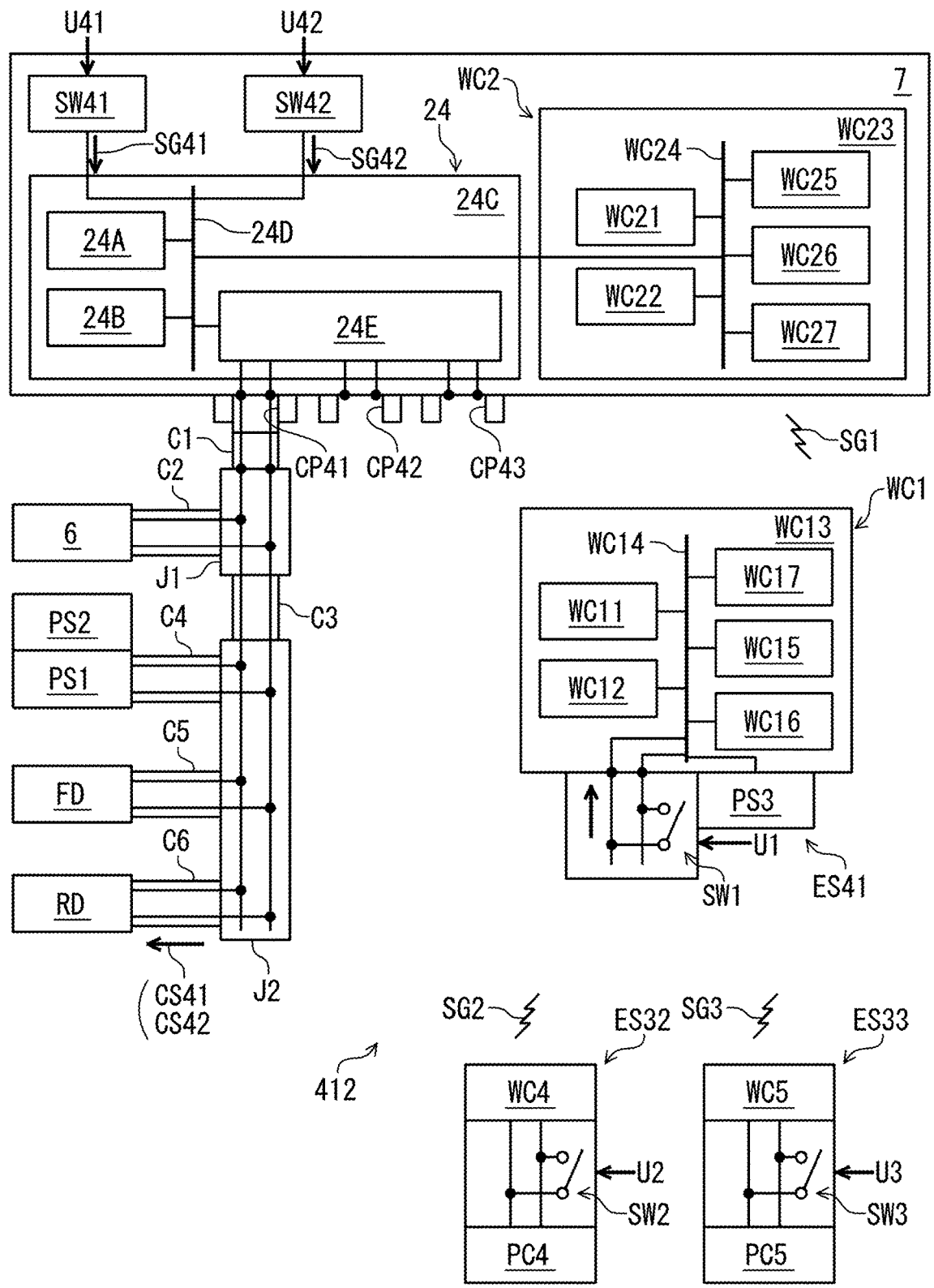
FIG. 13 is a block diagram of the human-powered vehicle illustrated in FIG. 12.

As seen in FIGS. 12 and 13, the electrical switch device ES41 for the human-powered vehicle 10 comprises the electrical switch unit SW1 and the wireless communicator WC1. The wireless communicator WC1 is configured to wirelessly transmit the signal SG1 to the operating device 7 configured to operate the electric component RD. The signal SG1 is configured to operate the electric component RD. In this embodiment, the electrical cable EC1 and the connector CN1 are omitted from the electrical switch device ES41.

The operating system 412 comprises the additional electrical switch device ES32 and the additional electrical switch device ES33 of the third embodiment. The wireless communicator WC1 is configured to wirelessly receive the additional signal SG2 from the second additional wireless communicator WC4 of the additional electrical switch device ES32. The wireless communicator WC1 is configured to wirelessly receive the additional signal SG3 from the third additional wireless communicator WC5 of the additional electrical switch device ES33.

First Modification

Figure 14:
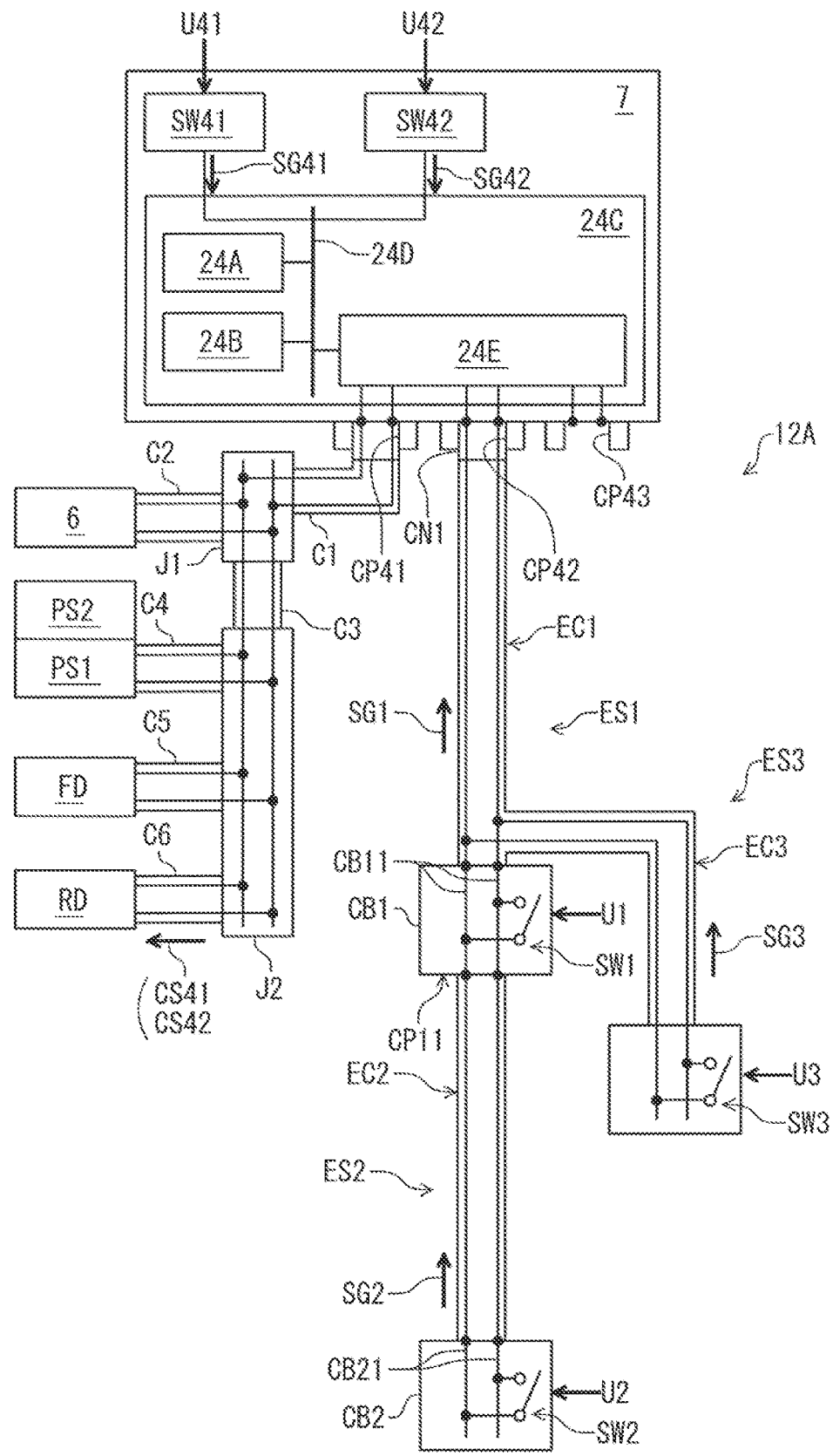
FIG. 14 is a block diagram of the human-powered vehicle including an operating system in accordance with a first modification of the first embodiment.

FIG. 14 depicts an operating system 12A in accordance with a first modification of the first embodiment. In the first embodiment, the connecting part CP11 includes the cable connection port CP11A, and the additional electrical switch device ES2 includes the additional connector CN2. As seen in FIG. 14, however, the connecting part CP11 can be configured to directly couple the additional electrical cable EC2 to the electrical switch unit SW1 without the cable connection port CP11A and the additional connector CN2. At least one of the second connecting part CP12 and the third connecting part CP13 can be omitted from the electrical switch device ES1. At least one of the additional connecting part CP21, the second additional connecting part CP22, and the third additional connecting part CP23 can be omitted from the additional electrical switch device ES2. At least one of the additional connecting part CP31, the second additional connecting part CP32, and the third additional connecting part CP33 can be omitted from the additional electrical switch device ES3. The electrical switch device ES1, the additional electrical switch device ES2, and the additional electrical switch device ES3 can be integrally provided with each other as a single unit. This modification can be applied to the connecting part and the connector of the operating systems 212 and 312 of the second and third embodiments.

Second Modification

In the first to fourth embodiments, the operating device 7 is electrically connected to the electric component RD with the electrical communication path PT. However, the operating device 7 can be connected to the electric component RD with another communication path such as wireless communication.

Figure 15:
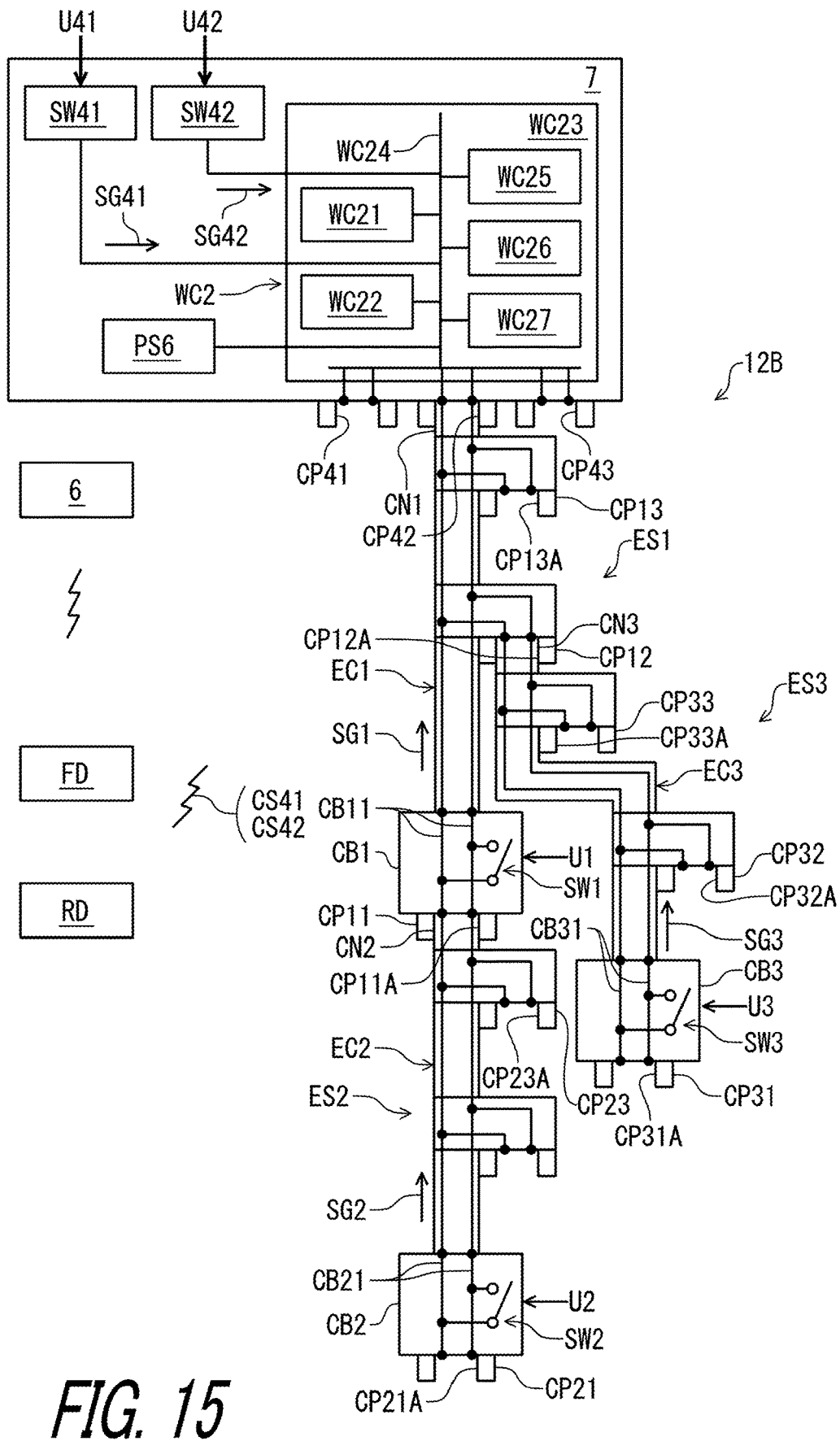
FIG. 15 is a block diagram of the human-powered vehicle including an operating system in accordance with a second modification of the first embodiment.

For example, FIG. 15 depicts an operating system 12B in accordance with a second modification of the first embodiment. In the operating system 12B of the second modification, the operating device 7 is configured to wirelessly transmit the signal SG1 to the electric component RD in response to the operation of the electrical switch device ES1. The operating device 6 is configured to wirelessly transmit a signal to the electric component FD in response to an operation of an electrical switch device of the operating device 6. The PLC controller 24 is omitted from the operating device 7. The power source PS is omitted from the operating system 12B. Instead, the operating device 7 includes the wireless communicator WC2 of the second embodiment. The operating device 7 includes a power source PS6 electrically connected to the wireless communicator WC2 to supply electric power to the wireless communicator WC2. Each of the electric components FD and RD includes a power source and a wireless communicator.

Figure 16:
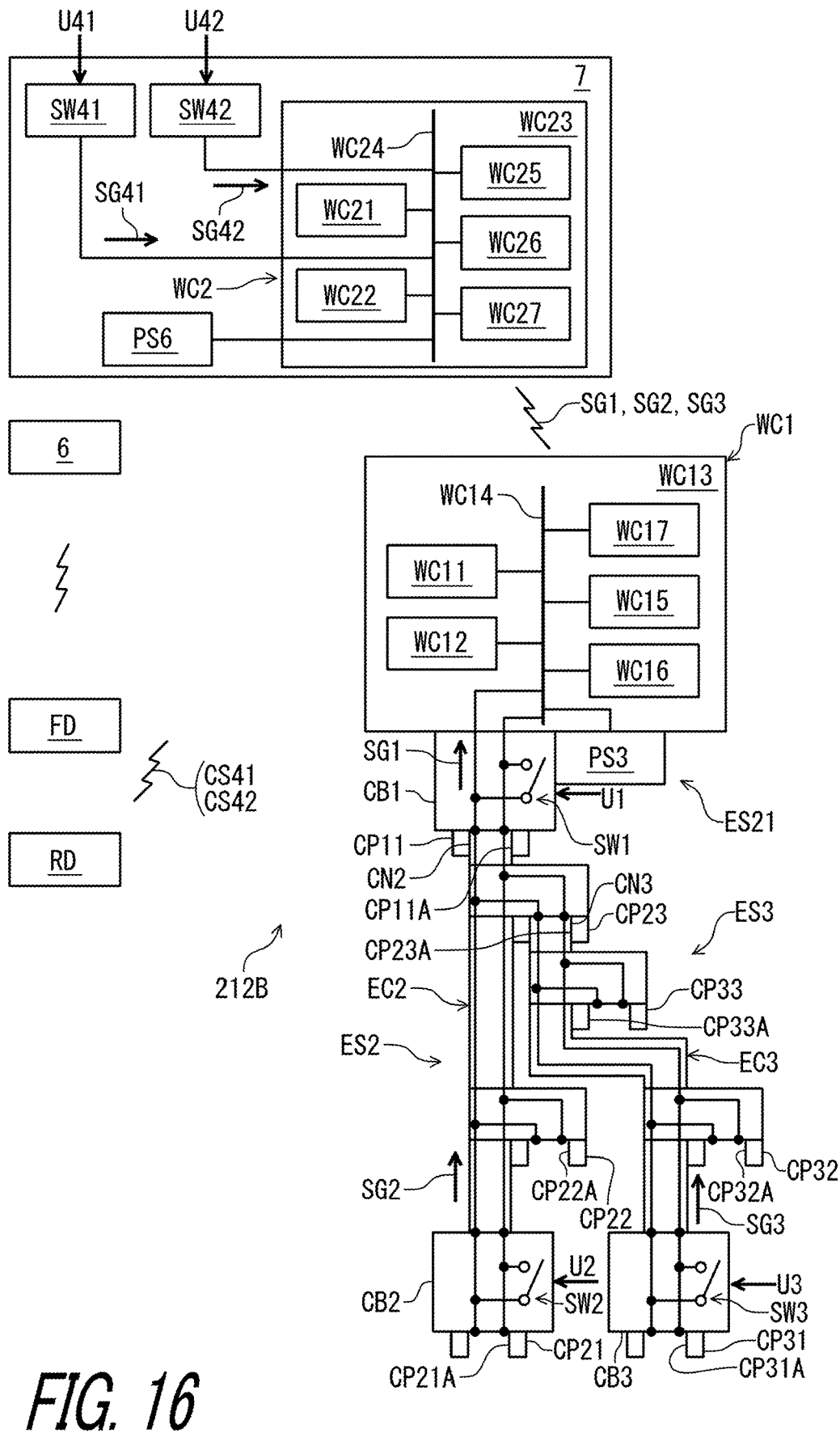
FIG. 16 is a block diagram of the human-powered vehicle including an operating system in accordance with a second modification of the second embodiment.
Figure 17:
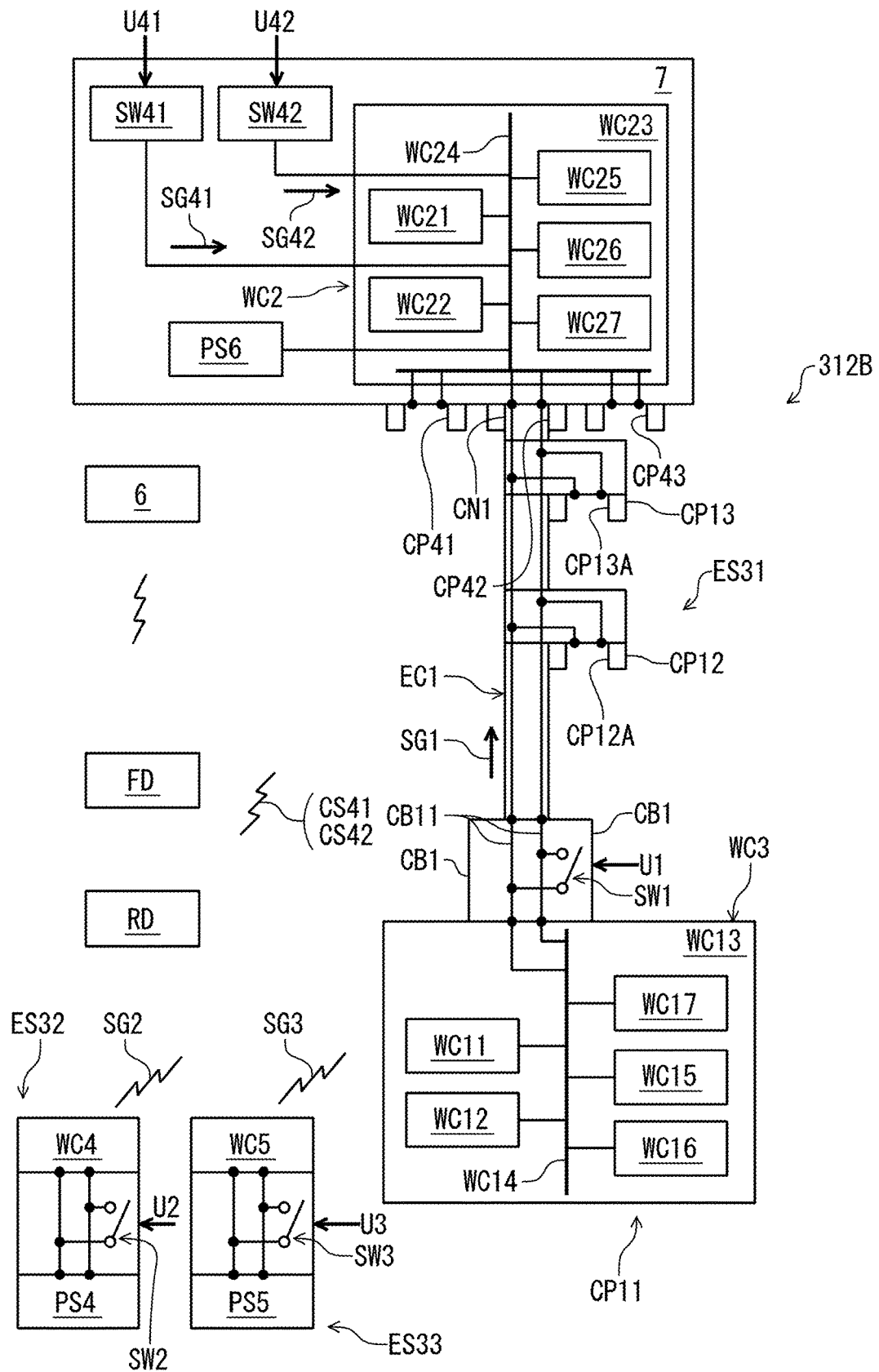
FIG. 17 is a block diagram of the human-powered vehicle including an operating system in accordance with a second modification of the third embodiment.
Figure 18:
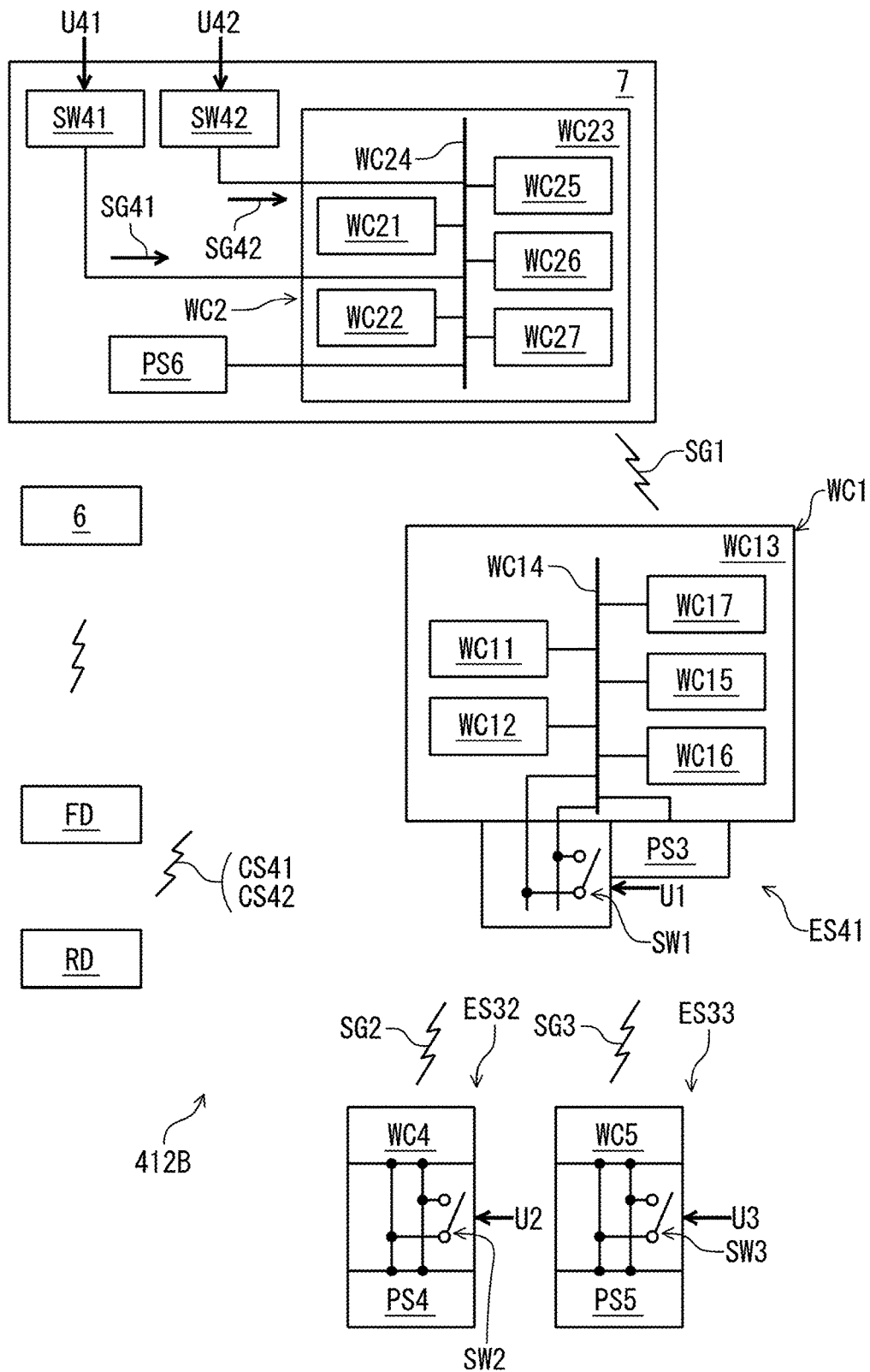
FIG. 18 is a block diagram of the human-powered vehicle including an operating system in accordance with a second modification of the fourth embodiment.

Similarly, FIG. 16 depicts an operating system 212B in accordance with the second modification of the second embodiment. FIG. 17 depicts an operating system 312B in accordance with the second modification of the third embodiment. FIG. 18 depicts an operating system 412B in accordance with the second modification of the fourth embodiment.

Third Modification

Figure 19:
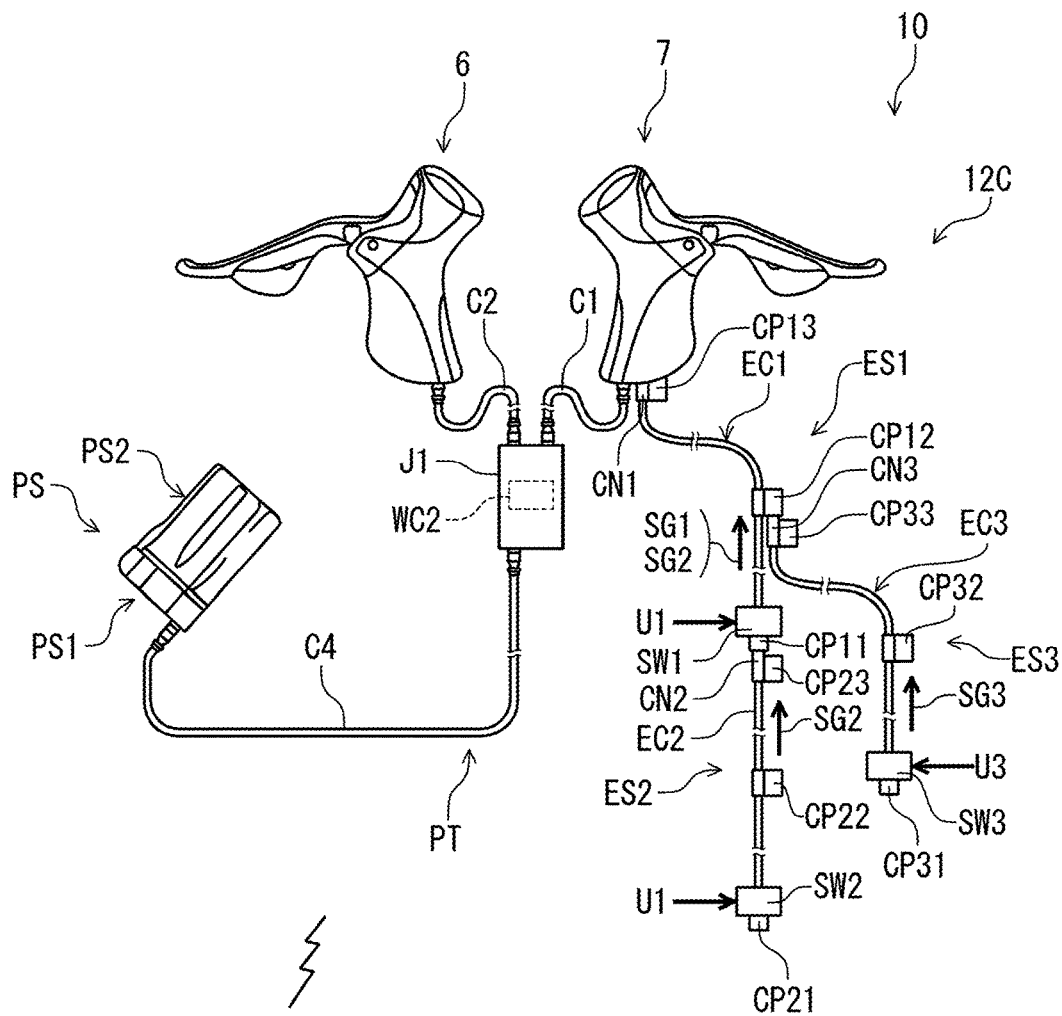
FIG. 19 is a schematic diagram of the human-powered vehicle including an operating system in accordance with a third modification of the first embodiment.
Figure 19:
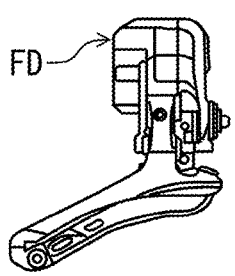
Figure 19:
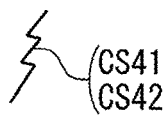
Figure 19:
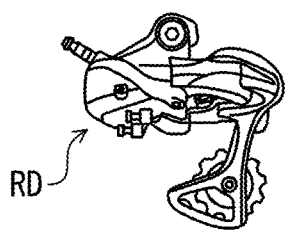

In the second modification, the operating device 7 includes the wireless communicator WC2. However, the wireless communicator WC2 can be provided at another device. For example, FIG. 19 depicts an operating system 12C in accordance with the third modification of the first embodiment. In the operating system 12C of the third modification, the wireless communicator WC2 is provided at the junction J1. The power source PS is electrically connected to the junction J1. Each of the electric components FD and RD includes a power source and a wireless communicator.

Figure 20:
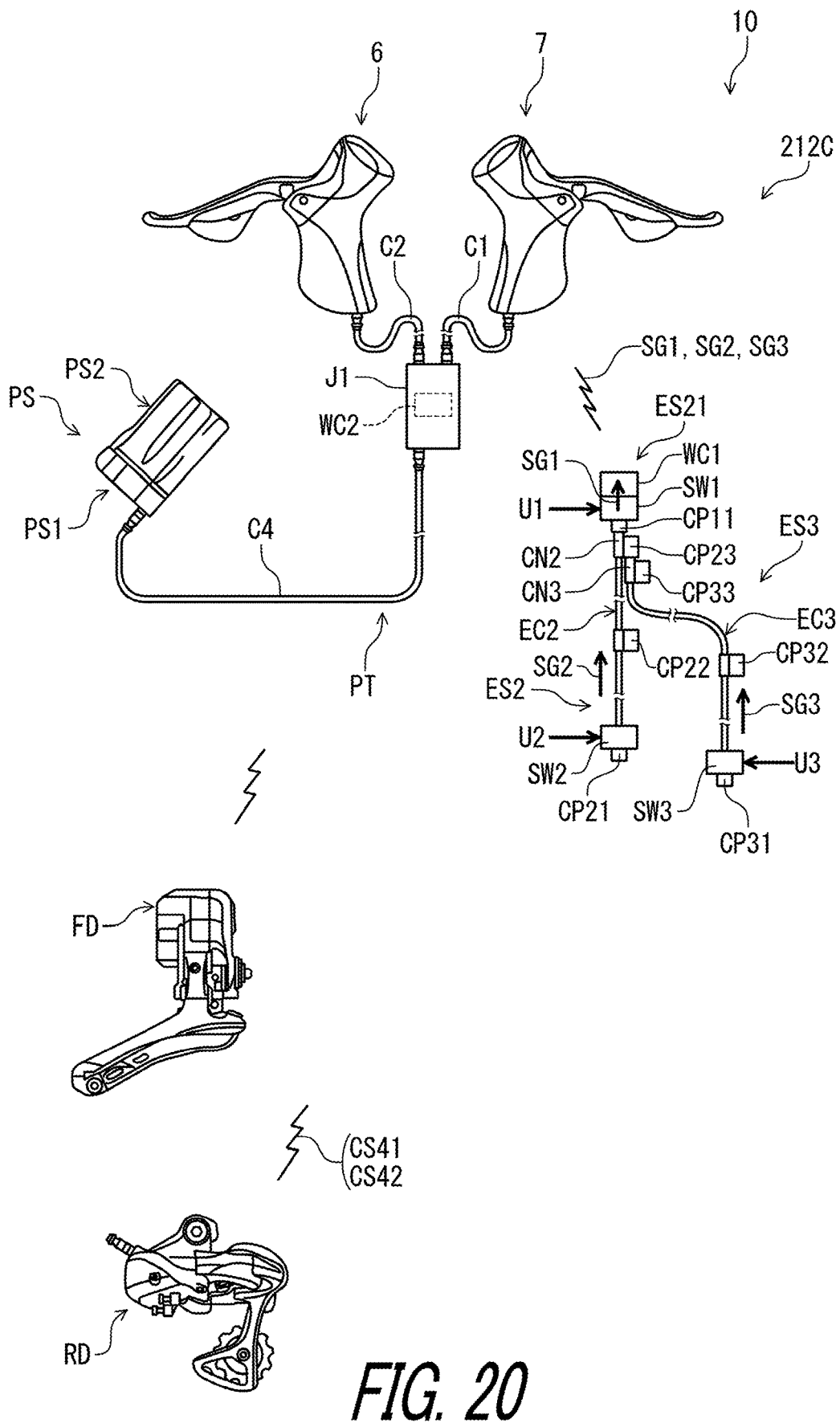
FIG. 20 is a schematic diagram of the human-powered vehicle including an operating system in accordance with a third modification of the second embodiment.
Figure 21:
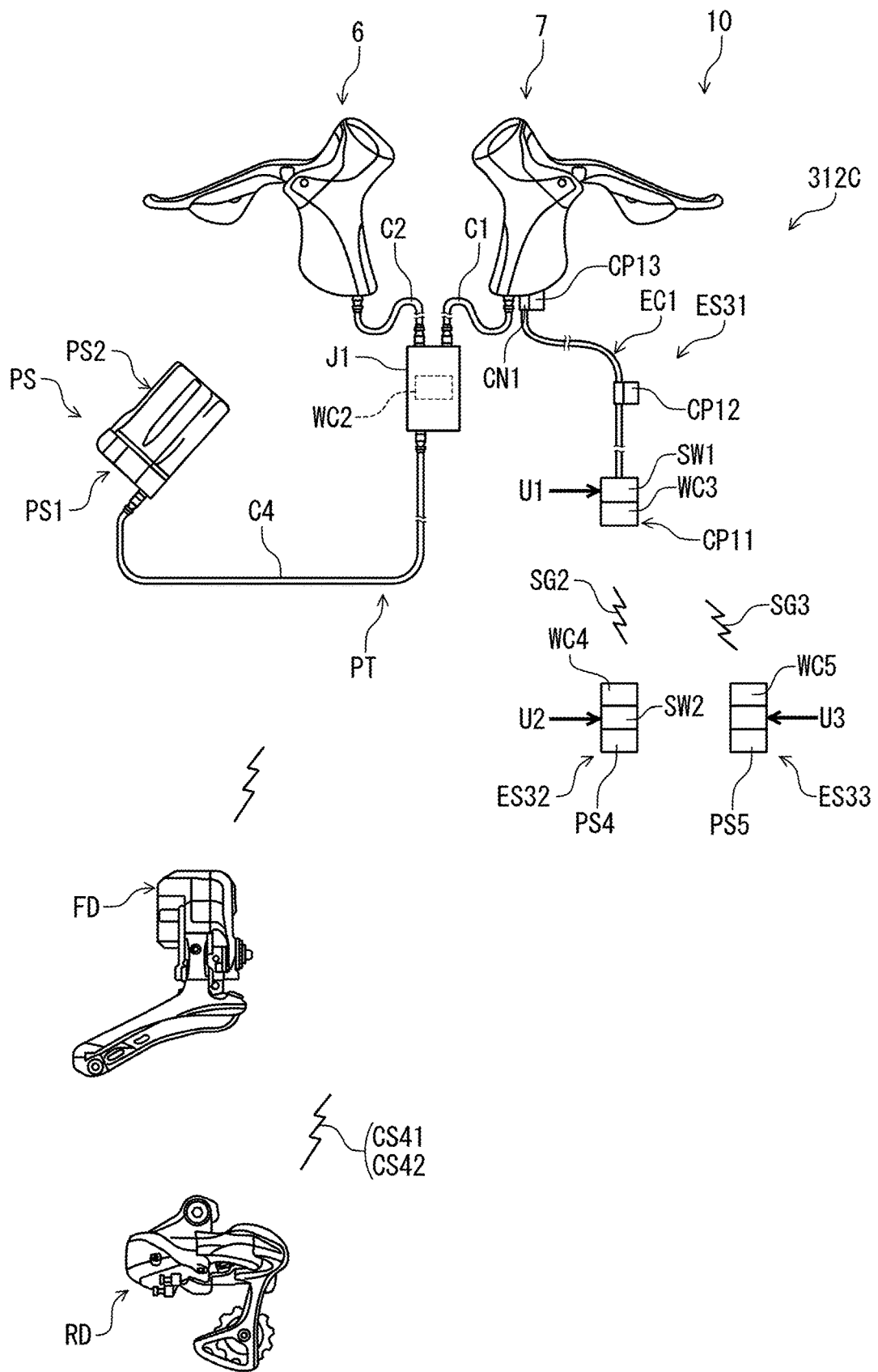
FIG. 21 is a schematic diagram of the human-powered vehicle including an operating system in accordance with a third modification of the third embodiment.
Figure 22:
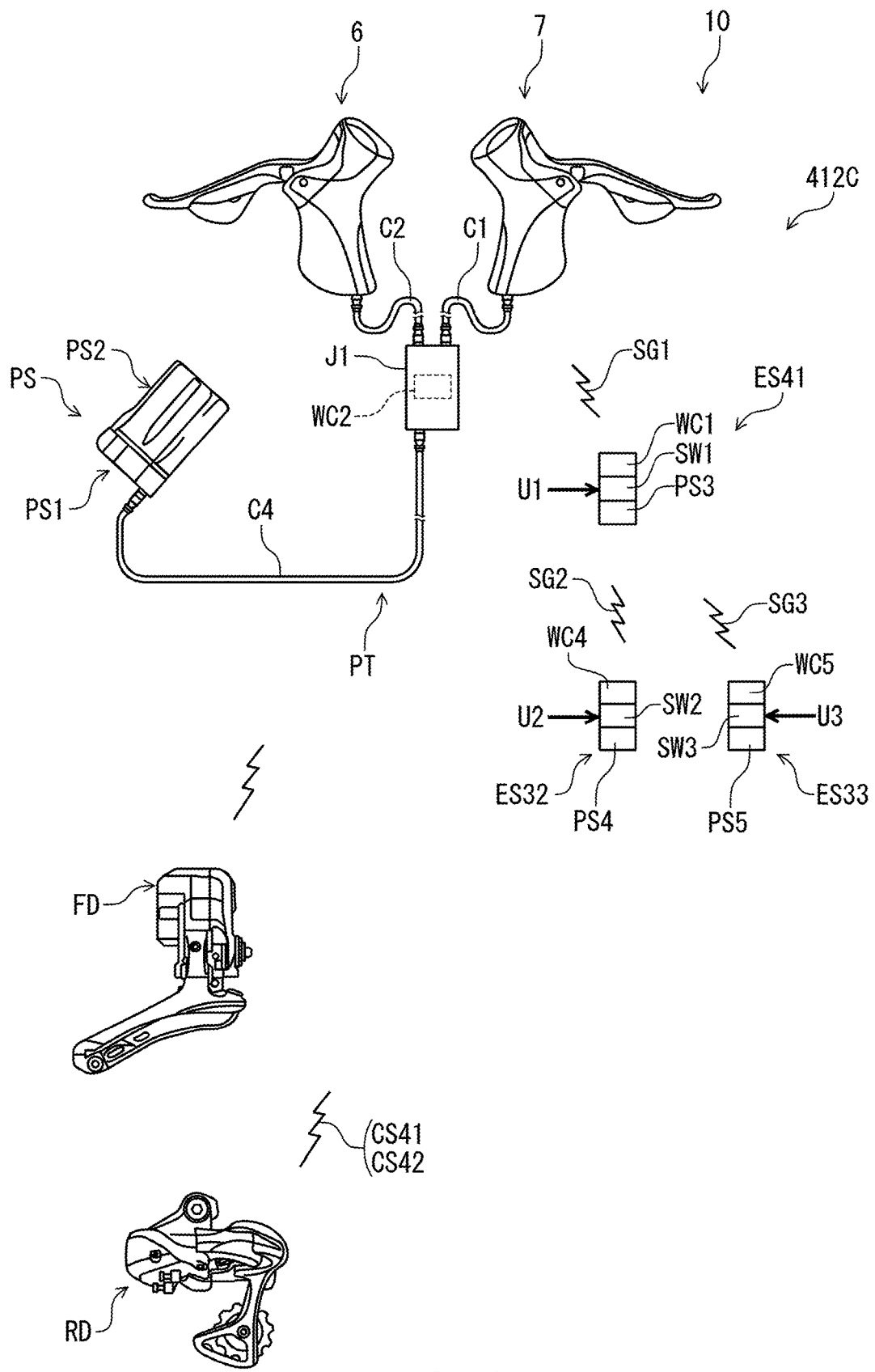
FIG. 22 is a schematic diagram of the human-powered vehicle including an operating system in accordance with a third modification of the fourth embodiment.

Similarly, FIG. 20 depicts an operating system 212C in accordance with the third modification of the second embodiment. FIG. 21 depicts an operating system 312C in accordance with the third modification of the third embodiment. FIG. 22 depicts an operating system 412C in accordance with the third modification of the fourth embodiment.

Fourth Modification

In the first to fourth embodiments, the electrical communication path PT includes the junctions J1 and J2 and the first to sixth cables C1 to C6. However, the structure of the electrical communication path PT is not limited to this embodiment. For example, at least one of the junctions J1 and J2 can be omitted from the electrical communication path PT. At least one of the first to sixth cables C1 to C6 can be omitted from the electrical communication path PT. In a case where the junction J2 is omitted, the third cable C3 is omitted from the electrical communication path PT, and the fourth to sixth cables C4 to C6 are connected to the junction J1.

Fifth Modification

Figure 23:
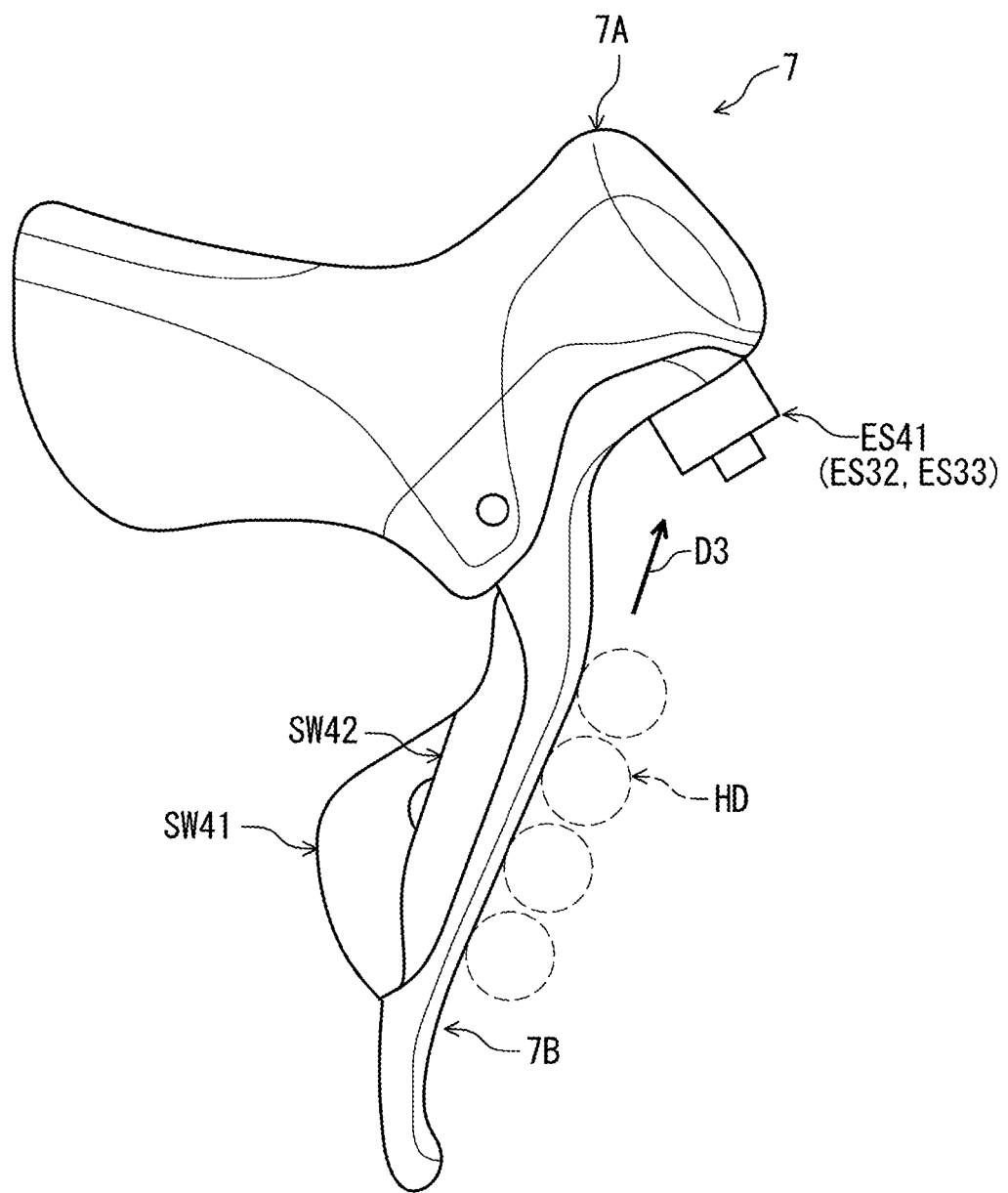
FIG. 23 is a side elevational view of an operating device of an operating system in accordance with a fifth modification of the third and fourth embodiments.
Figure 24:
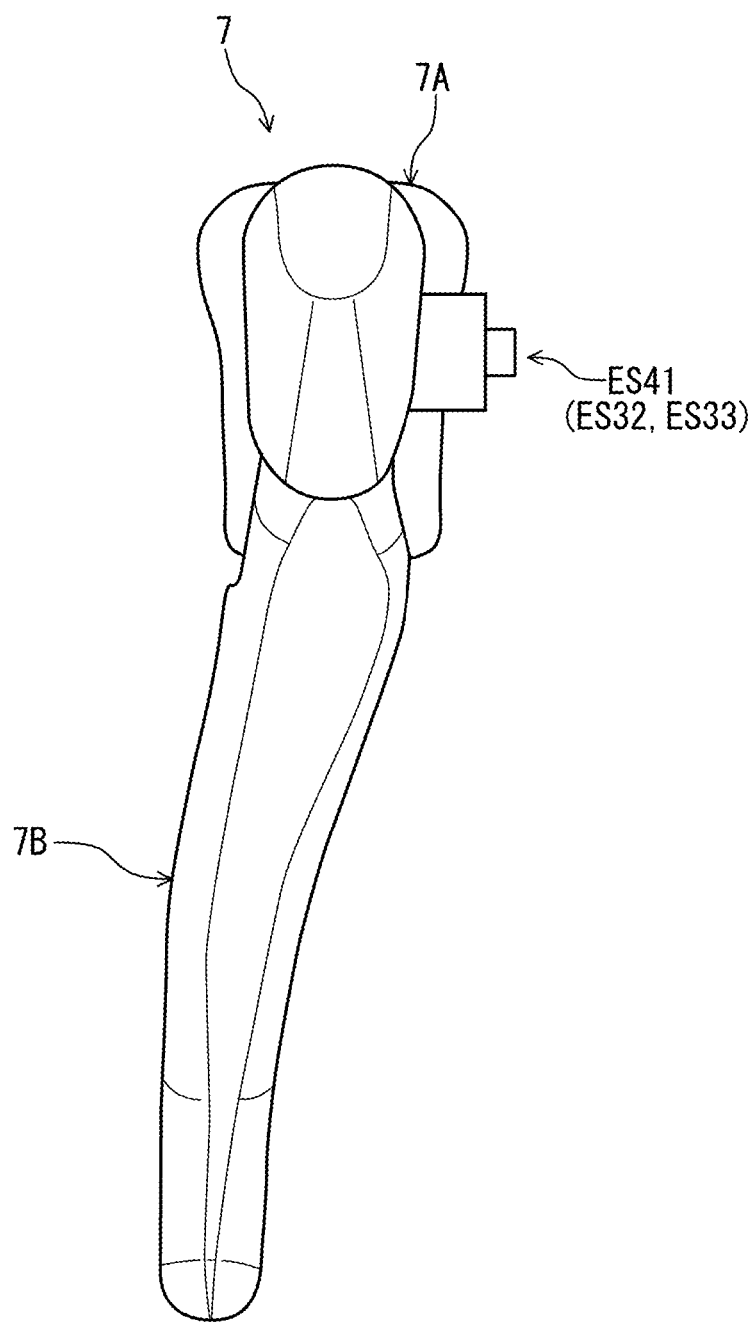
FIG. 24 is a side elevational view of an operating device of an operating system in accordance with a fifth modification of the third and fourth embodiments.

In the third embodiment, the operating system 312 includes the additional electrical switch devices ES32 and ES33. In the fourth embodiment, the operating system 412 includes the electrical switch device ES41 and the additional electrical switch devices ES32 and ES33. As seen in FIG. 23, at least one of the electrical switch device ES41 and the additional electrical switch devices ES32 and ES33 can be mounted on the operating device 7. Specifically, at least one of the electrical switch device ES41 and the additional electrical switch devices ES32 and ES33 can be attached to a front side of the base member 7A. The electrical switch device ES41 can restrict the rider's hand HD from unintentionally lose the rider's grip on the operating member 7B in a direction D3 by contacting with fingers (e.g., index finger) of the rider's hand HD. As seen in FIG. 24, at least one of the electrical switch device ES41 and the additional electrical switch devices ES32 and ES33 can be attached to a lateral side of the base member 7A of the operating device 7. The electrical switch device ES41 can restrict the rider's hand HD from unintentionally lose the rider's grip on the operating member 7B in a direction D3 by contacting with fingers (e.g., thumb) of the rider's hand HD.

Fifth Embodiment

An operating system 512 for the human-powered vehicle 10 including an electrical switch device ES5 in accordance with a fifth embodiment will be described below referring to FIGS. 25 to 27. The electrical switch device ES5 has substantially the same structure as that of the electrical switch device ES1 except for the electrical switch unit SW1. Thus, elements having substantially the same function as those in the above embodiments will be numbered the same here and will not be described and/or illustrated again in detail here for the sake of brevity.

Figure 25:
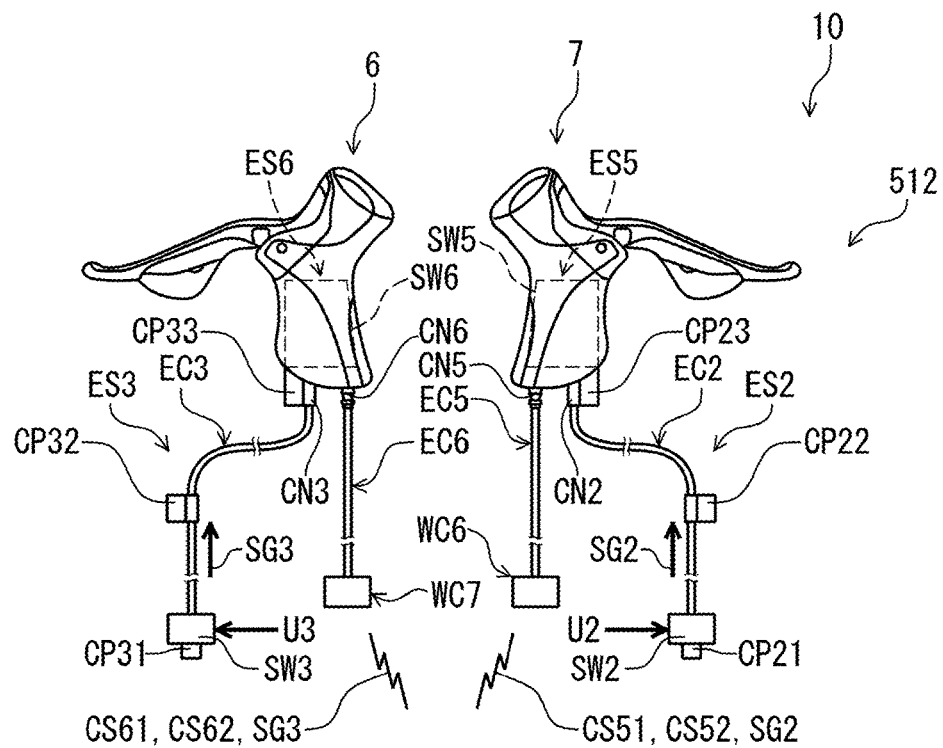
FIG. 25 is a schematic diagram of the human-powered vehicle provided with an operating system in accordance with a fifth embodiment.
Figure 25:
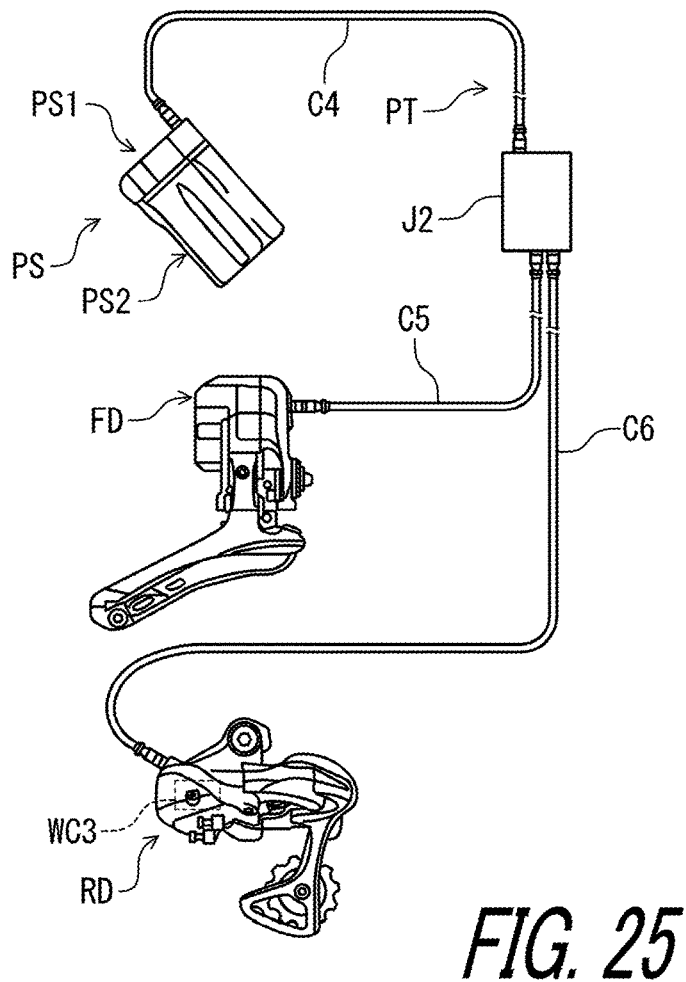

As seen in FIG. 25, the electrical switch device ES5 for the human-powered vehicle 10 comprises an electrical switch unit SW5. The electrical switch unit SW5 is configured to generate a signal in response to a user input. The operating system 512 includes an electrical switch device ES6. The electrical switch device ES6 for the human-powered vehicle 10 comprises an electrical switch unit SW6. The electrical switch unit SW6 is configured to generate a signal in response to a user input. In this embodiment, the electrical switch unit SW5 is mounted to the operating device 7. The electrical switch unit SW6 is mounted to the operating device 6. The first to third electrical cables C1 to C3 and the junction J1 are omitted from the electrical communication path PT. The additional electrical switch device ES2 is detachably connected to the electrical switch device ES5. The additional electrical switch device ES3 is detachably connected to the electrical switch device ES6.

Figure 26:
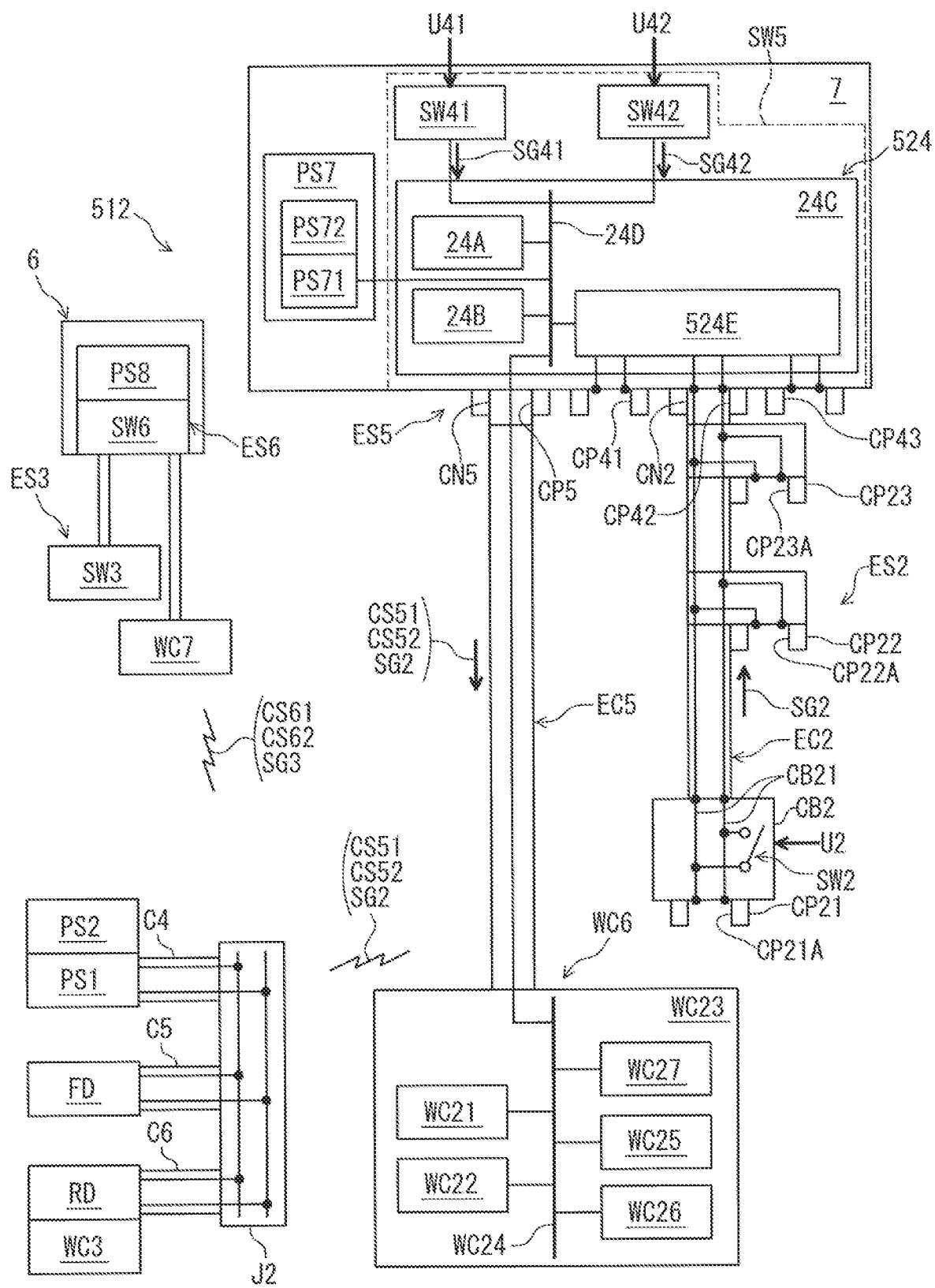
FIG. 26 is a block diagram of the human-powered vehicle provided with the operating system illustrated in FIG. 25.

As seen in FIG. 26, the electrical switch unit SW5 is configured to generate a signal CS51 in response to the first user input U41. The electrical switch unit SW5 is configured to generate a signal CS52 in response to the second user input U42. The electrical switch unit SW5 includes the first electrical switch SW41, the second electrical switch SW42, and a signal controller 524. The signal controller 524 is electrically connected to the first electrical switch SW41 to generate the signal CS51 in response to the first operation signal SG41 from the first electrical switch SW41. The signal controller 524 is electrically connected to the second electrical switch SW42 to generate the signal CS52 in response to the second operation signal SG42 from the second electrical switch SW42.

The signal controller 524 has substantially the same structure as that of the PLC controller 24. In this embodiment, the signal controller 524 includes the processor 24A, the memory 24B, the circuit board 24C, the bus 24D, and a signal generation circuit 524E. The signal generation circuit 524E is configured to generate the signal CS51 in response to the first operation signal SG41. The signal generation circuit 524E is configured to generate the signal CS52 in response to the second operation signal SG42.

The electrical switch device ES5 for the human-powered vehicle 10 comprises the connecting part CP42. The connecting part CP42 is provided on the electrical switch unit SW5 so as to electrically connect the additional electrical switch device ES2 to the electrical switch device ES5. The electrical switch device ES5 comprises the connecting part CP41 and the connecting part CP43. However, the total number of the connecting parts is not limited to this embodiment.

The electrical switch device ES5 is configured to selectively transmit the signal CS51 or CS52 from the electrical switch unit SW5 and the additional signal SG2 from the additional electrical switch device ES2 to the operating device 7 configured to operate the electric component RD. The electrical switch device ES5 is configured to transmit the signal CS51 from the electrical switch unit SW5 to the operating device 7 configured to operate the electric component RD if the first electrical switch SW41 receives the first user input U41. The electrical switch device ES5 is configured to transmit the signal CS52 from the electrical switch unit SW5 to the operating device 7 configured to operate the electric component RD if the second electrical switch SW42 receives the second user input U42. The electrical switch device ES5 is configured to transmit the additional signal SG2 from the additional electrical switch device ES2 to the operating device 7 configured to operate the electric component RD if the additional electrical switch unit SW2 receives the additional user input U2.

The connecting part CP42 is configured to electrically and detachably connect the additional electrical switch device ES2 to the electrical switch device ES5. The additional electrical switch device ES2 can be electrically and detachably connected to the electrical switch device ES5 through the connecting part CP41 or CP43.

The electrical switch device ES5 further comprises a wireless communicator WC6 configured to wirelessly and selectively transmit the signal CS51 or CS52 and the additional signal SG2 to operate the electric component RD. The wireless communicator WC6 is configured to wirelessly and selectively transmit the signals CS51 and CS52 and the additional signal SG2 to operate the electric component RD. The wireless communicator WC6 is configured to be electrically connected to the electrical switch device ES5. In this embodiment, the signal CS51 includes an upshift operating signal to execute the upshifting of the electric component RD. The signal CS52 includes a downshift operating signal to execute the downshifting of the electric component RD. The additional signal SG2 includes the upshift or downshift operating signal. However, the signals CS51 and CS52 and the additional signal SG2 are not limited to this embodiment.

In this embodiment, the electrical switch device ES5 includes an electrical cable EC5 and a connector CN5. The electrical cable EC5 electrically connects the wireless communicator WC6 to the connector CN5. The electrical switch device ES5 includes an additional connecting part CP5 electrically connected to the bus 24D of the electrical switch unit SW5. The connector CN5 is provided at an end of the electrical cable EC5 to be detachably coupled to the additional connecting part CP5 of the electrical switch device ES5. However, the electric cable EC5 can be directly connected to the electrical switch unit SW5 without the connector CN5 and the additional connecting part CP5.

The operating system 512 includes a power source PS7 configured to supply electric power to the electrical switch device ES5. The power source PS7 is provided in the operating device 7. The power source PS7 includes a battery holder PS71 and a battery PS72. The battery holder PS71 is electrically connected to the bus 24D to supply electric power to the electrical switch unit SW5.

The wireless communicator WC6 has substantially the same structure as that of the wireless communicator WC2 described in the second embodiment. In this embodiment, the wireless communicator WC6 includes the processor WC21, the memory WC22, the circuit board WC23, the bus WC24, the signal transmitting circuit WC25, the signal receiving circuit WC26, and the antenna WC27. The electric cable EC5 is electrically connected to the bus WC24 of the wireless communicator WC6.

The additional wireless communicator WC3 is mounted to the electric component RD. The additional wireless communicator WC3 is configured to wirelessly receive the signals CS51 and CS52 and the additional signal SG2 from the wireless communicator WC6. However, the additional wireless communicator WC3 can be mounted to other components such as the junction J2, the electric component FD, or the power source PS. The fourth to sixth electrical cables C4 to C6 and the junction J2 can be omitted if the additional wireless communicator WC3 is mounted to each of the electric components RD and FD. In such embodiments, the power supply PS is mounted to each of the electric components RD and FD.

The wireless communicator WC6 is configured to receive the signal CS51 from the electrical switch device ES5 if the first electrical switch SW41 receives the first user input U41. The wireless communicator WC6 is configured to wirelessly transmit the signal CS51 to the electric component RD through the additional wireless communicator WC3 if wireless communicator WC6 receives the signal CS51 from the electrical switch device ES5.

The wireless communicator WC6 is configured to receive the signal CS52 from the electrical switch device ES5 if the second electrical switch SW42 receives the second user input U42. The wireless communicator WC6 is configured to wirelessly transmit the signal CS52 to the electric component RD through the additional wireless communicator WC3 if wireless communicator WC6 receives the signal CS52 from the electrical switch device ES5.

The wireless communicator WC6 is configured to receive the additional signal SG2 from the additional electrical switch device ES2 through the electrical switch device ES5 if the additional electrical switch unit SW2 receives the additional user input U2. The wireless communicator WC6 is configured to wirelessly transmit the additional signal SG2 to the electric component RD through the additional wireless communicator WC3 if wireless communicator WC6 receives the additional signal SG2 from the additional electrical switch device ES2 through the electrical switch device ES5.

As seen in FIG. 26, the operating system 512 includes an electrical switch device ES6, the additional electrical switch device ES3, and a power supply PS8. The electrical switch device ES6 is mounted to the operating device 6. The electrical switch device ES6 includes an electrical switch unit SW6, a wireless communicator WC7, an electric cable EC6, and a connector CN6. The electrical switch unit SW6 has substantially the same structure as that of the electrical switch unit SW5 of the electrical switch device ES5. The wireless communicator WC7 has substantially the same structure as that of the wireless communicator WC6. The electric cable EC6 has substantially the same structure as that of the electric cable EC5. The connector CN6 has substantially the same structure as that of the connector CN5. The power source PS8 has substantially the same structure as that of the power source PS7. The electrical switch device ES6 has substantially the same structure as that of the electrical switch device ES5 except that the electrical switch device ES6 is configured to selectively transmit a signal CS61 or CS62 from the electrical switch unit SW6 and an additional signal SG3 from the additional electrical switch device ES3 to the operating device 6 configured to operate the electric component FD. Thus, they will not be described in detail here for the sake of brevity.

In this embodiment, the signal CS61 includes an upshift operating signal for the electric component FD. The signal CS62 includes a downshift operating signal for the electric component FD. The additional signal SG3 includes the upshift operating signal for the electric component FD. However, the signals CS61 and CS62 and the additional signal SG3 are not limited to this embodiment.

Figure 27:
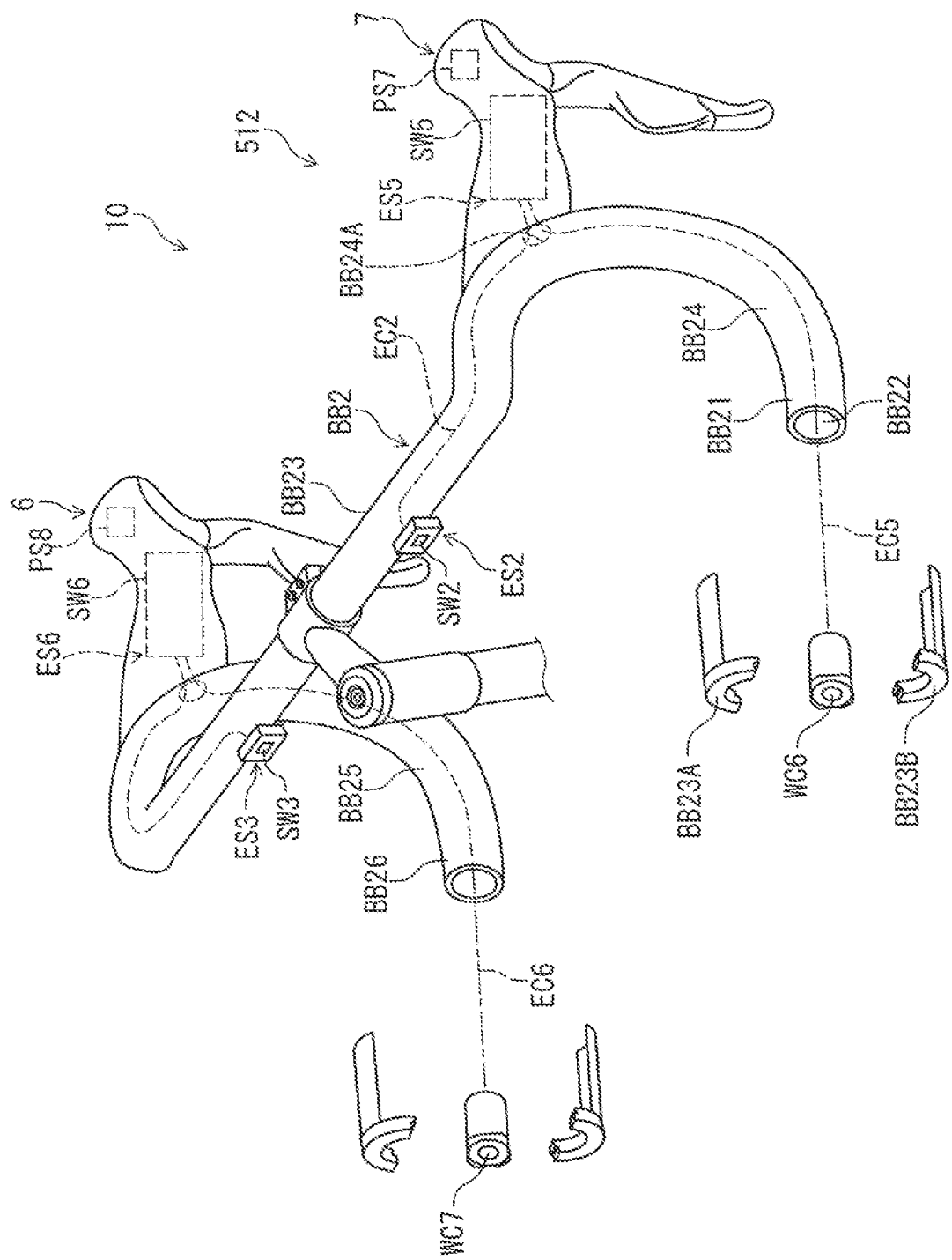
FIG. 27 is a perspective view of the operating system illustrated in FIG. 25, with a handlebar.

As seen in FIG. 27, the wireless communicator WC6 is configured to be attached to a bar end BB21 of the handlebar BB2. The wireless communicator WC6 is configured to be inserted to an internal space BB22 of the handlebar BB2. In this embodiment, the handlebar BB2 includes a flat-bar part BB23, a curved part BB24, and a curved part BB25. The bar end BB21 is provided at an end of the curved part BB24. The internal space BB22 is provided inside the flat-bar part BB23, the curved part BB24, and the curved part BB25.

The wireless communicator WC6 is provided between a first bracket BB23A and a second bracket BB23B. The wireless communicator WC6, the first bracket BB23A, and the second bracket BB23B are provided in the bar end BB21. The electric cable EC5 extends from the electrical switch device ES5 to the wireless communicator WC6 through the internal space BB22 of the handlebar BB2. The curved part BB24 of the handlebar BB2 includes a hole BB24A through which the electric cable EC5 passes.

The additional electrical switch unit SW2 of the additional electrical switch device ES2 is attached to the flat-bar part BB23 of the handlebar BB2. The additional electric cable EC2 extends from the electrical switch device ES5 to the additional electrical switch unit SW2 through the internal space BB22 of the handlebar BB2. The additional electric cable EC2 extends through the hole BB24A of the curved part BB24.

As with the wireless communicator WC6, the wireless communicator WC7 is configured to be attached to a bar end BB26 of the handlebar BB2. The wireless communicator WC7 is configured to be inserted to the internal space BB22 of the handlebar BB2. The additional electrical switch unit SW3 of the additional electrical switch device ES3 is attached to the flat-bar part BB23 of the handlebar BB2. The arrangement of the wireless communicator WC7 and the additional electrical switch unit SW3 which are connected with the electrical switch device ES6 is substantially the same as the arrangement of the wireless communicator WC6 and the additional electrical switch unit SW2 which are connected with the electrical switch device ES5 except that the wireless communicator WC7 is attached to the bar end BB26 of the curved part BB25. Thus, they will not be described in detail here for the sake of brevity.

Figure 28:
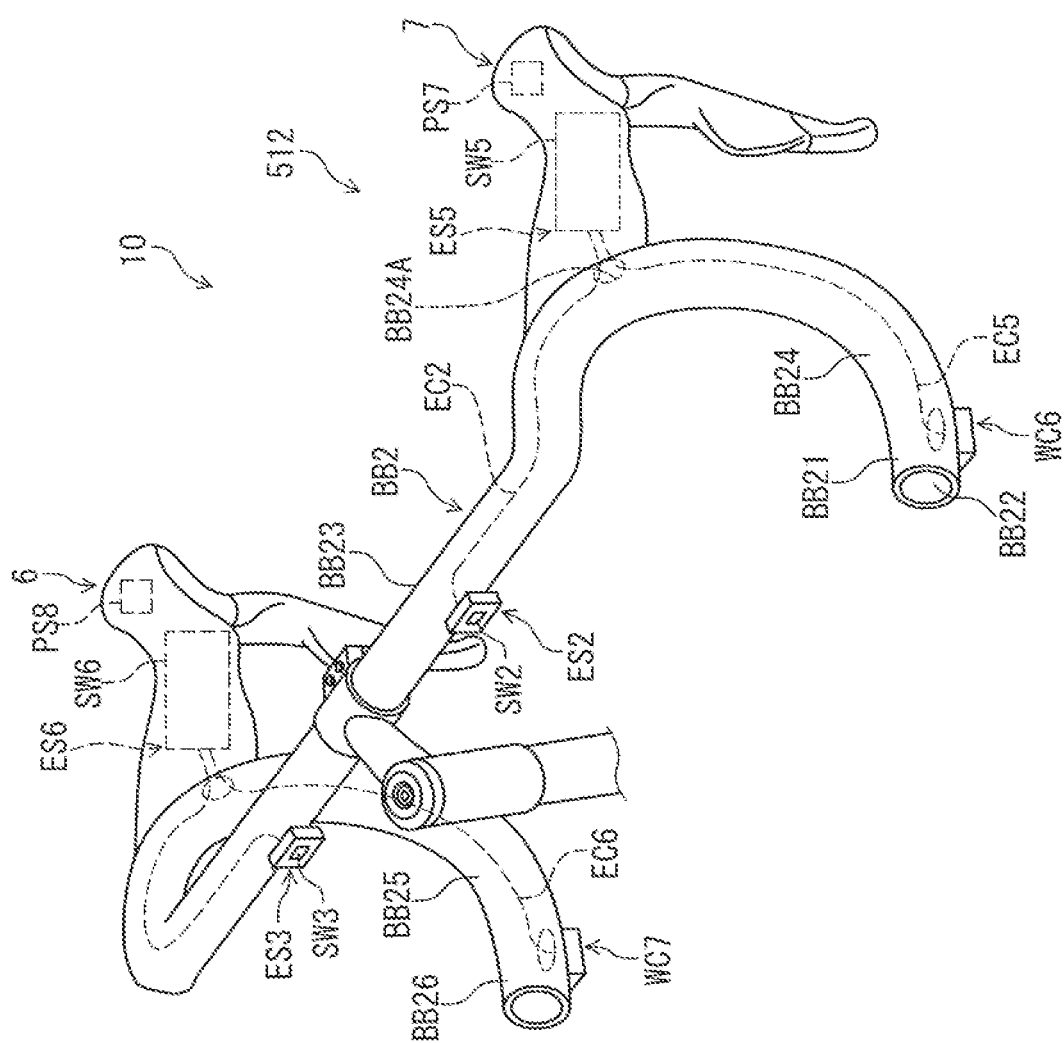
FIG. 28 is a perspective view of the operating system in accordance with a modification of the fifth embodiment.

As seen in FIG. 28, the wireless communicator WC6 can be configured to be attached to an outer surface of the handlebar BB2. The wireless communicator WC7 can be configured to be attached to the outer surface of the handlebar BB2. For example, the wireless communicator WC6 can be configured to be attached to the outer surface of the bar end BB21 of the handlebar BB2. The wireless communicator WC7 can be configured to be attached to the outer surface of the bar end BB26 of the handlebar BB2.

In the fifth embodiment, the electrical switch device ES5 is electrically connected to the additional electrical switch device ES2 including the first to third additional connecting parts CP21, CP22 and CP23. However, the electrical switch device ES5 can be electrically connected to an additional electrical switch device which does not include at least one of the first to third additional connecting parts CP21, CP22, and CP23. Furthermore, the electric cable EC5 of the electrical switch device ES5 can include a connecting part such as the first to third additional connecting parts CP21, CP22 and CP23.

Figure 29:
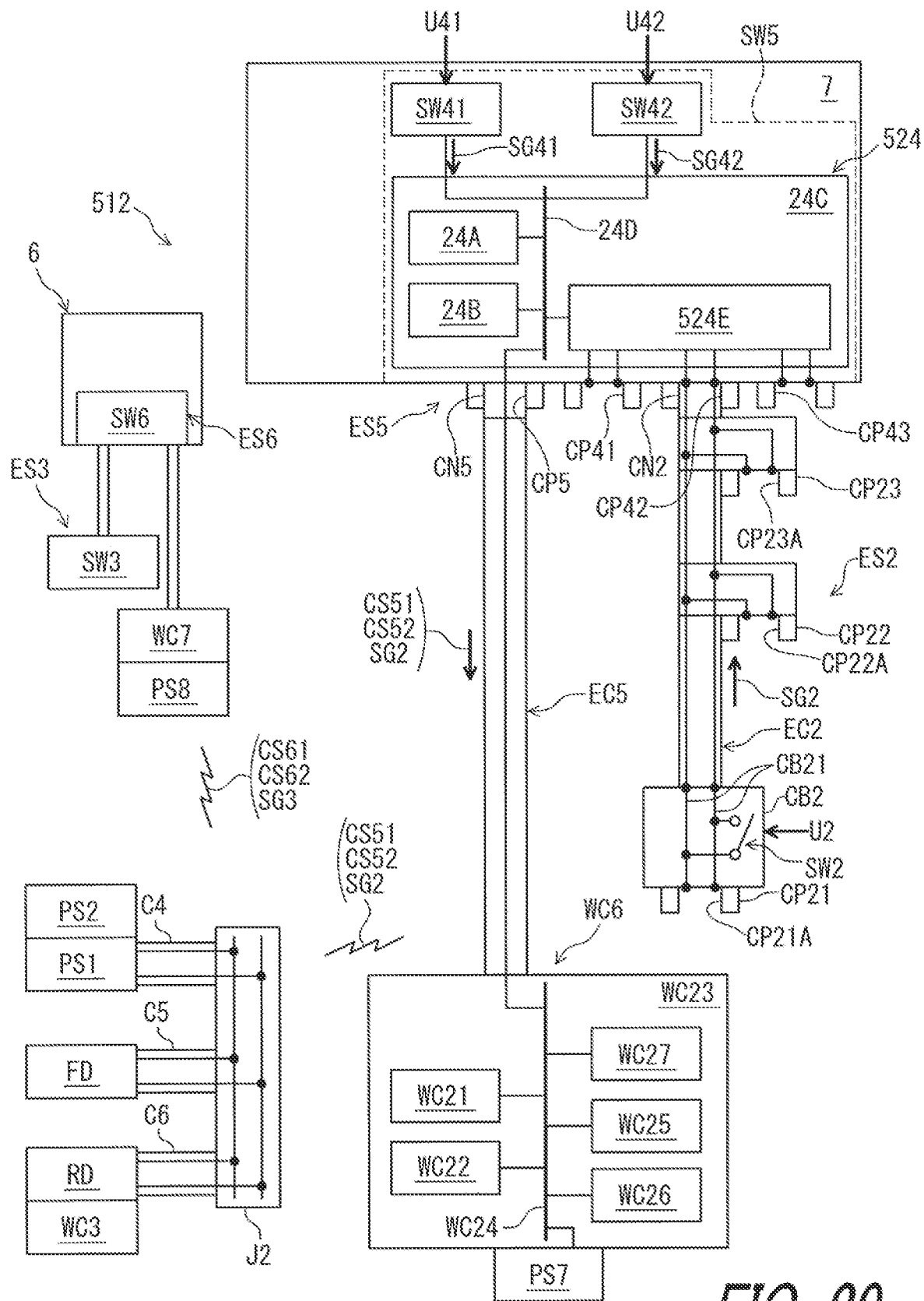
FIG. 29 is a block diagram of the human-powered vehicle provided with the operating system in accordance with another modification of the fifth embodiment.

In the fifth embodiment, the power source PS7 is provided in the operating device 7. The power supply PS8 is provided in the operating device 6. However, the arrangement of the power source PS7 is not limited to this embodiment. The arrangement of the power source PS8 is not limited to this embodiment. The power supply SP7 can be provided outside the operating device 7 or to other components. The power supply SP8 can be provided outside the operating device 6 or to other components. As seen in FIG. 29, for example, the power supply PS7 can be mounted to the wireless communicator WC6. The power supply PS8 can be mounted to the wireless communicator WC7.

Figure 30:
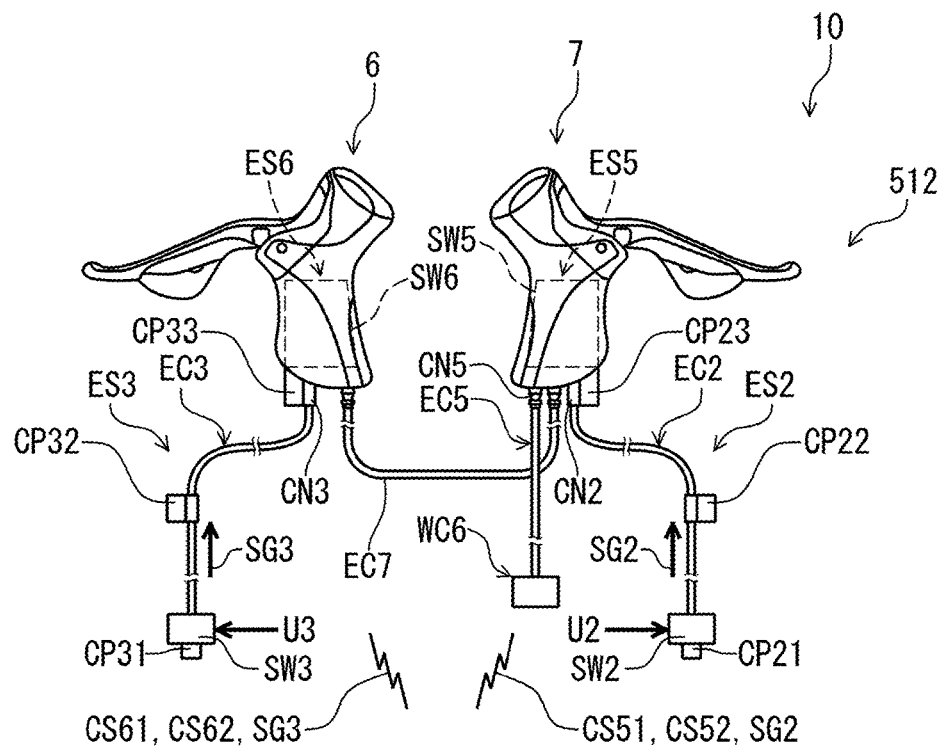
FIG. 30 is a schematic diagram of the human-powered vehicle provided with the operating system in accordance with another modifications of the fifth embodiment.
Figure 30:
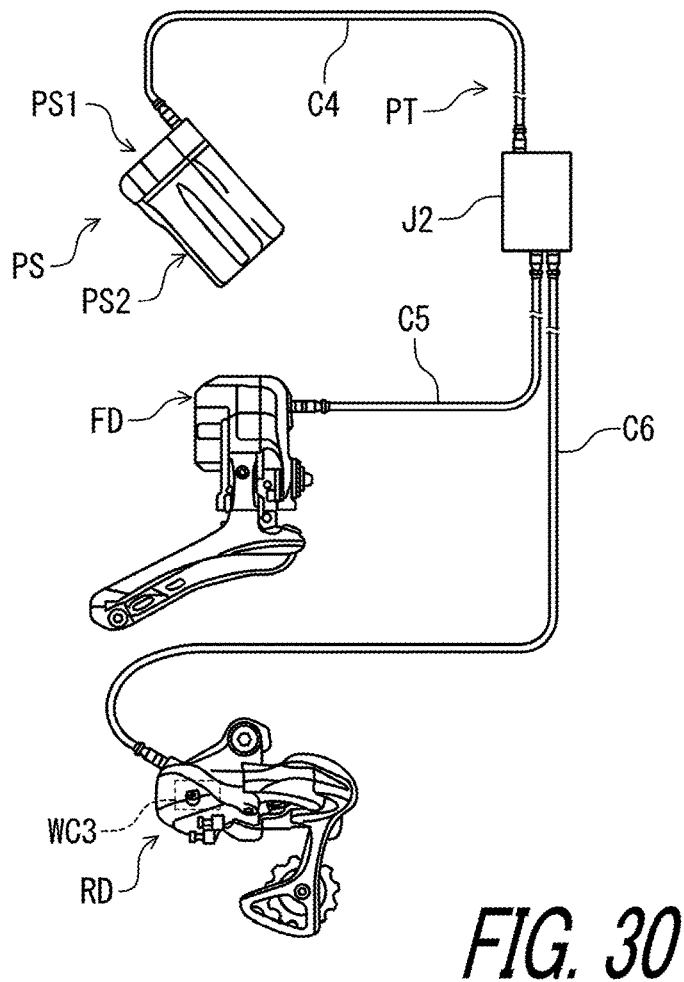
Figure 31:
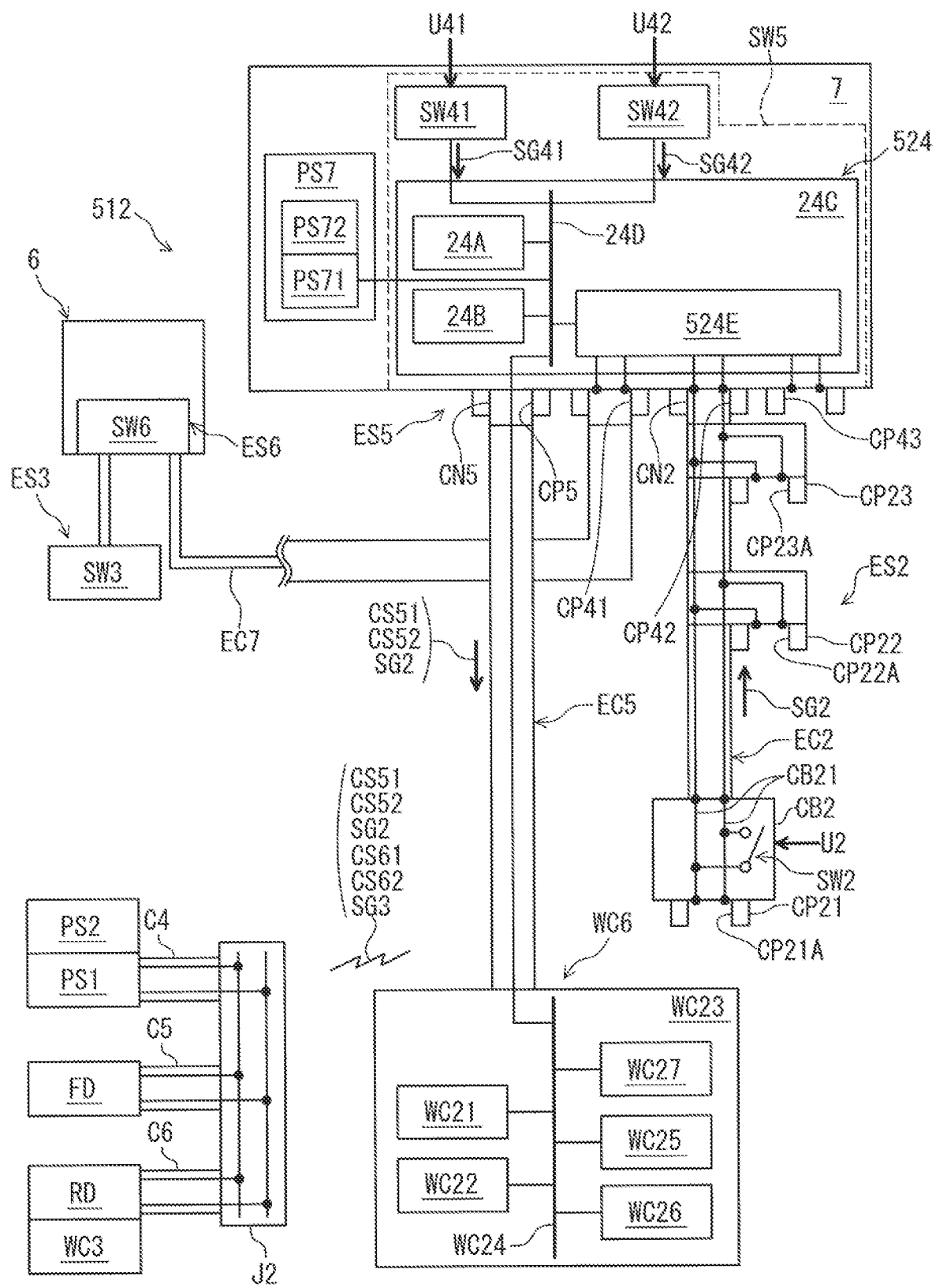
FIG. 31 is a block diagram of the human-powered vehicle provided with the operating system in accordance with another modifications of the fifth embodiment.

In the fifth embodiment, the electrical switch device ES5 includes the wireless communicator WC6, and the electrical switch device ES6 includes the wireless communicator WC7. However, the electrical switch device ES5 and the electrical switch device ES6 can share the wireless communicator WC6 or WC7. As seen in FIGS. 30 and 31, for example, the electrical switch device ES6 can be electrically connected to the electrical switch device ES5 with an electric cable EC7. The wireless communicator WC7 and the power supply PS8 are omitted from the electrical switch device ES6. The wireless communicator WC6 is configured to wirelessly transmit the signals CS61 and CS62 and the additional signal SG3 to the additional wireless communicator WC3 through the electrical switch device ES5.

The above embodiments and the above modifications can be at least party combined with each other if needed and/or desired.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An electrical switch device for a human-powered vehicle, comprising:
    an electrical switch unit configured to generate a signal in response to a user input; and
    a connecting part provided on the electrical switch unit so as to electrically connect an additional electrical switch device to the electrical switch device,
    the electrical switch device being configured to selectively transmit the signal from the electrical switch unit and an additional signal from the additional electrical switch device to an operating device configured to operate an electric component, and
    the connecting part including a cable connection port to which the additional electrical switch device is detachably coupled.

2. The electrical switch device according to claim 1, wherein
    the connecting part is configured to be coupled to an additional electrical cable of the additional electrical switch device.

3. The electrical switch device according to claim 1, wherein
    the connecting part includes an additional wireless communicator configured to wirelessly receive the additional signal.

4. The electrical switch device according to claim 1, further comprising
    a mounting structure configured to be mounted to a bicycle body.

5. The electrical switch device according to claim 1, wherein
    the operating device comprises a base member and an operating member pivotally coupled to the base member.

6. An operating system for a human-powered vehicle, comprising:
    the electrical switch device according to claim 1; and
    the operating device configured to operate the electric component in response to each of the signal and the additional signal.

7. The electrical switch device according to claim 1, further comprising
    an electrical cable configured to electrically connect the electrical switch unit to the operating device.

8. The electrical switch device according to claim 7, further comprising
    a connector provided at an end of the electrical cable to be detachably coupled to the operating device.

9. The electrical switch device according to claim 7, wherein
    the connecting part is configured to be electrically connected to the electrical cable.

10. The electrical switch device according to claim 9, wherein
    the electrical cable is electrically connected to the additional electrical switch device to transmit the additional signal to the operating device.

11. The electrical switch device according to claim 1, further comprising
    a wireless communicator configured to wirelessly and selectively transmit the signal and the additional signal to operate the electric component.

12. The electrical switch device according to claim 11, wherein
    the wireless communicator is configured to be attached to a bar end of a handlebar.

13. The electrical switch device according to claim 12, wherein
    the wireless communicator is configured to be inserted to an internal space of the handlebar.

14. The electrical switch device according to claim 12, wherein
    the wireless communicator is configured to be attached to an outer surface of the handlebar.

15. An electrical switch device for a human-powered vehicle, comprising:
    an electrical switch unit configured to generate a signal in response to a user input; and
    a connecting part configured to electrically and detachably connect an additional electrical switch device to the electrical switch device,
    the electrical switch device being configured to selectively transmit the signal from the electrical switch unit and an additional signal from the additional electrical switch device to an operating device configured to operate an electric component.

16. The electrical switch device according to claim 15, further comprising
    an electrical cable configured to electrically connect the electrical switch unit to the operating device.

17. The electrical switch device according to claim 16, further comprising
    a connector provided at an end of the electrical cable to be detachably coupled to the operating device.

18. The electrical switch device according to claim 17, wherein
    the connecting part is provided on at least one of the electrical switch unit, the electrical cable and the connector.

19. An electrical switch device for a human-powered vehicle, comprising:

an electrical switch unit configured to generate a signal in response to a user input;

a wireless communicator configured to wirelessly transmit the signal to an operating device configured to operate an electric component, the signal being configured to operate the electric component; and a connecting part configured to electrically and detachably connect an additional electrical switch device to the electrical switch device.

20. An operating system for a human-powered vehicle, comprising:

an electrical switch unit disposed at a first position on a handlebar; and a wireless communicator electrically connected to an operating device, the wireless communicator disposed at a second position on the handlebar, the second position being farther from the operating device than the first position is from the operating device, wherein the wireless communicator includes a processor configured to generate a wireless signal in response to actuation of the electrical switch unit, the wireless signal being transmitted to an electrical component via the wireless communicator, and the electrical switch unit is a satellite switch provided separately from the operating device.

* * * * *